(12) United States Patent
Tsutsui et al.

(10) Patent No.: US 6,549,527 B1
(45) Date of Patent: Apr. 15, 2003

(54) RADIO RECEIVER AND DESPREADER

(75) Inventors: Masafumi Tsutsui, Kawasaki (JP); Yoshinori Tanaka, Yokohama (JP); Shuji Kobayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/352,262

(22) Filed: Jul. 13, 1999

(30) Foreign Application Priority Data

Jan. 7, 1999 (JP) .......................................... 11-002188

(51) Int. Cl.[7] .............................................. H04B 7/216
(52) U.S. Cl. ........................ 370/342; 455/562; 342/373; 375/148
(58) Field of Search ................................ 370/335, 342, 370/535, 336, 337, 328; 455/561, 562, 456, 507, 449, 450, 426; 342/373, 372; 375/148, 349, 355

(56) References Cited

U.S. PATENT DOCUMENTS

| | | | | |
|---|---|---|---|---|
| 5,400,037 A | * | 3/1995 | East | 342/372 |
| 5,859,870 A | * | 1/1999 | Tsujimoto | 375/143 |
| 5,886,988 A | * | 3/1999 | Yun et al. | 370/329 |
| 5,963,548 A | * | 10/1999 | Virtanen | 370/335 |

\* cited by examiner

*Primary Examiner*—Nguyen T. Vo
*Assistant Examiner*—Nghi H. Ly
(74) *Attorney, Agent, or Firm*—Katten Muchin Zavis Rosenman

(57) ABSTRACT

A radio receiver for improving transmission performance by applying prescribed processing to received signals having reached to plural antennas concurrently, and a despreader to be mounted in the radio receiver. In such a radio receiver, the received signals are decimation-sampled, and multiplexed into a multiple-signal, which is demultiplexed and prediction processed for interpolating the values decimated in the sampling. In the despreader, the transfer functions and despreading codes are multiplied in real time, and interpolation processing and despreading processing are performed based on the filtering characteristics set as the results of the multiplication. In a radio transmission system to which the present invention is applied, it becomes possible to perform all of desired synthetic processing, phase scanning, frequency scanning and feeding point scanning adaptive to an array antenna system, without lowering the performance of the system or increasing the scale and the price of the hardware.

15 Claims, 15 Drawing Sheets

| ADDRESS | COEFFICIENT SEQUENCE |
|---|---|
| (1) | $C_{-16}, C_{-12}, C_{-8}, C_{-4}, C_1, C_5, C_9, C_{13}$ |
| (2) | $C_{-15}, C_{-11}, C_{-7}, C_{-3}, C_2, C_6, C_{10}, C_{14}$ |
| (3) | $C_{-14}, C_{-10}, C_{-6}, C_{-2}, C_3, C_7, C_{11}, C_{15}$ |
| (4) | $C_{-13}, C_{-9}, C_{-5}, C_{-1}, C_4, C_8, C_{12}, C_{16}$ |

FIG. 8(a)

| VALUE OF SYNCHRONIZING SIGNAL (ADDRESS) | DISTINCTION SEQUENCE |
|---|---|
| 0 | (1) |
| 1 | (2) |
| 2 | (3) |
| 3 | (4) |

FIG. 8(b)

RADIO RECEIVER AND DESPREADER

BACKGROUND OF THE INVENTION

1. Field of the Invention

The invention relates to a radio receiver for improving transmission performance based on a desired directivity or diversity system by applying prescribed processing to received signals having reached to a plurality of antennas concurrently, and a despreader to be mounted in the radio receiver and for applying despread processing to received signals which is adaptive to a CDMA system.

2. Description of the Related Art

A code division multiple access (CDMA) system, which essentially has confidentiality and interference-resistibility, is a multiple access system in which the suppression of cochannel interference and the efficient reuse of radio frequencies are possible.

In addition, such a CDMA system is positively being applied to mobile communication systems recently due to the fact that the establishment of technologies for realizing the transmitting power control with high accuracy and high response has enabled the flexible control of radio transmission characteristics by the sector zone.

FIG. 14 is a diagram showing an example of a configuration of a receiving system in a mobile communication system to which the CDMA system is applied.

In the diagram, the feeding ends of the four antennas 141-1 to 141-4 are individually connected to the four inputs of an A/D conversion package 142. The four outputs of the A/D conversion package are connected to the corresponding inputs of a receiver package 144 via lines 143-1 to 143-4, respectively.

The A/D conversion package 142 is composed of: a front end part 145-1 and an A/D converter (A/D) 146-1 cascade-connected between the feeding end of the antenna 141-1 and an end of the line 143-1; a front end part 145-2 and an A/D converter (A/D) 146-2 cascade-connected between the feeding end of the antenna 141-2 and an end of the line 143-2; a front end part 145-3 and an A/D converter (A/D) 146-3 cascade-connected between the feeding end of the antenna 141-3 and an end of the line 143-3; and a front end part 145-4 and an A/D converter (A/D) 146-4 cascade-connected between the feeding end of the antenna 141-4 and an end of the line 143-4.

The receiver package 144 is composed of receiving parts 147-1 to 147-4 and a searcher 148. Each of the receiving parts 147-1 to 147-4 is connected to all of the other ends of the lines 143-1 to 143-4, and supplied with control signals, which designates the type of the despreading code to be applied, from the outside (from an unshown channel controlling equipment, for example). The searcher 148 is arranged between the other end of the line 143-4 and the controlled inputs of the receiving parts 147-1 to 147-4.

The receiving part 147-1 is composed of: multipliers 149-11 to 149-14, whose inputs are individually connected to the other ends of the lines 143-1 to 143-4; a despreading code generating part (CODE) 150-1, whose input is supplied with the said control signals, whose other input is connected to the corresponding output of the searcher 148, and whose output is connected at the output to the other inputs of the multipliers 149-11 to 149-14; and dump filters (DUMP) 151-11 to 151-14, whose filters are arranged individually at the subsequent stages of the multipliers 149-11 to 149-14, and output demodulation signals.

In connection to this, since the receiving parts 147-2 to 147-4 are the same as the receiving part 147-1 in configuration, the corresponding components are hereinafter designated by like numerals with the first index numbers of "2" to "4", and explanations and drawings thereof are omitted here.

The searcher 148 is composed of: a cascade-connected matched filter 152, smoothing part 153, and a RAM 154; and a path sensing part 155 arranged at the subsequent stage of the RAM 154 and connected to the corresponding inputs of the despreading code generating parts 150-1 to 150-4 which are individually equipped in the receiving parts 147-1 to 147-4.

The matched filter 152 is composed of: a shift register 156, where it is operated in synchronization with the above-mentioned despreading code and with a clock, which is is 8fc in frequency with respect to the chip rate fc of the despreading code, and has stages of (8L−1) in number with respect to the word length L of the despreading code; a multiplier 157, where it individually connected to each of the inputs and outputs of all the stages of the shift register 156, and weights (either "1" or "−1") representing the logical values of the corresponding bits are previously individually set among the bits composing a despreading code; and an adder 158, where it is arranged at the subsequent stage of the multiplier 157 as the final stage.It is assumed that the number of stages of the shift register 156 is "31," for simplicity in th following.

In the conventional example of such configuration, the front end parts 145-1 to 145-4 respectively convert the received signals having reached concurrently to the antenna 141-1 to 141-4 into equivalent signals in the baseband domain (hereinafter, referred to as "spreading signals").

The respective A/D converters 146-1 to 146-4 simultaneously over-sample the spread signals at a period of (⅛fc) (hereinafter, referred to as "over-sampling period") with respect to the chip rate fc to generate discrete signals, and send the discrete signals to the lines 143-1 to 143-4.

In the searcher 148 equipped in the receiver package 144, the shift register 156 sequentially stores the discrete signals supplied through the line 143-4, and the multiplier 157 and the adder 158 correlate between the stored discrete signals and the despreading code given in advance as the said weights.

The smoothing part 153 obtains a delay profile as shown in FIG. 15., and stores it in the RAM 154 by averaging the results of the correlation over a period of plural times or more than the period of the despreading code, by every period of the despreading code, and in the order of time series.

The path sensing part 155 reads out the delay profile stored in the RAM 154 as described above, in the order of time series at the periods of the despreading code. By this means, the path sensing part 155 outputs a "path detection signal," which is composed of pulse sequences showing the time point in which the averaged value exceeding a predetermined threshold value is detected, re-cyclically at the period of the despreading code.

Among the receiving parts 147-1 to 147-4, in the receiving part 147-1, for example, the despreading code generating part 150-1 begins to generate a despreading code at the time point in which a channel allocated based on a prescribed procedure of channel control is shown and the control corresponding signals are given from the outside are supplied concurrently among the pulsed train supplied as the above-mentioned path detection signals.

The multipliers 149-11 to 149-14 apply despread processing to the discrete signals by multiplying the despreading code and the discrete signals supplied through the lines 143-1 to 143-4.

As a result, among the components contained in the received signals having reached to the antennas 141-1 to 141-4, four demodulation signals showing components in the channel allocated under channel control are obtained respectively in the baseband domains at the outputs of the multipliers 149-11 to 149-14.

In connection to this, these modulation signals are perfomed prescribed filter processing in the dump filters 151-11 to 151-14 respectively, and synthetic processing for extracting only the components arriving at the antennas 141-1 to 141-4 based on adaptive algorithms.

However, such synthetic processing is not the feature of the present invention; therefore, the systems containing the adaptive algorithms to be applied and the directivity and diversity systems to be achieved may be of any kind as long as they are adaptive to desired sector zones.

Now, in the above-mentioned conventional example, the number of the lines designated by the numeral "143" increases in proportion to the number of the antennas designated by the numeral "141". The number of lines can be lowered, for example by multiplexing the discrete signals generated by the A/D converters 146-1 to 146-4.

However, due to the maximum intrinsic speeds of applicable semiconductor devices and the restriction of power consumption, such configuration in which the discrete signals are simply multiplexed as described above was actually difficult to apply.

Besides, since the bit rate of signals transmitted through the lines 143-1 to 143-4 reaches several megabits per second through several dozen megabits per second, the lines 143-1 to 143-4 need to have the structures for suppressing the radiation of electromagnetic noises applied.

Moreover, since the above-mentioned number of antennas is increasable in the future for configuring sector zones of higher accuracy and smaller sector zones, there is a strong possibility for hampering the functional distribution between the A/D conversion package 142 and the receiver package 144 and the load distribution among plural receiver packages.

SUMMARY OF THE INVENTION

In view of the foregoing, an object of the present invention is to provide a radio receiver and a despreader in which the flexible modularization is achieved without greatly increasing the complexity of the configuration of the hardware.

Another object of the present invention is to enable all of desired synthetic processing, phase scanning, frequency scanning and feeding point scanning adaptive to an array antenna system, without lowering the performance of the applied radio transmission systems or greatly increasing the dimension and the price of the hardware.

The foregoing objects can be achieved by the provision of a radio receiver comprising: a plurality N of decimation means for sampling received signals having reached concurrently to a plurality N of antennas respectively in the baseband regions thereof at a plurality N of different phases and at a frequency twice or more the occupied bandwidths thereof to generate discrete signals individually corresponding to the received signals; multiplexing means for multiplexing the discrete signals and outputting a multiple-signal; demultiplexing means for demultiplexing the multiple-signal and restoring the plurality N of discrete signals; and a plurality N of prediction means for subjecting the discrete signals to prediction processing for predicting instantaneous values thereof individually at a common time point given from the outside or set in advance to generate baseband signals respectively showing the received signals having reached concurrently to the plurality N of antennas.

In such a radio receiver, the above-mentioned discrete signals are respectively generated without being sampled for the above-mentioned instantaneous values to be interpolated in the process of the prediction processing among the instantaneous values of the received signals having reached concurrently to the plurality N of antennas, and are multiplexed by the multiplexing means before supplied to the demultiplexing means.

As a result, in the present invention, even in the cases where the number N of the antennas to be mounted is large or the occupied bands of the received signals having reached to the antennas are wide, the band of the multiple-signal outputted by the multiplexing means is held narrow, and the number of lines connecting the multiplexing means and the demultiplexing means is held below the number N of the antennas with high accuracy.

Besides, the foregoing objects can be achieved by the radio receiver wherein the received signals having reached concurrently to the plurality N of antennas are generated based on a direct sequence in which a spreading code of fc in chip rate is applied, and are respectively sampled by the plurality N of decimation means in synchronization with a sampling clock below (½fc) in period.

In such a radio receiver, the discrete signals to be generated individually by the decimation means are generated by sampling the above-mentioned received signals within the occupied bands in the baseband regions of the received signals at a period in which the sampling theorem holds.

This, accordingly, allows the present invention to be applied to radio transmission systems to which a direct sequence is applied.

In addition, the foregoing objects can be achieved by the radio receiver wherein the received signals having reached concurrently to the plurality N of antennas are respectively sampled at different phases set at regular intervals below (½Nfc) on the time axis.

In such a radio receiver, N transfer functions showing the filtering characteristics to be applied individually in the prediction processing by the plurality N of prediction means are allocated at regular intervals in phase space; therefore, it becomes possible to simplify the algorithms required for the calculation or to standardize the configuration of the hardware for actual use in the setting.

Moreover, the foregoing objects can be achieved by the provision of a radio receiver comprising: path monitoring means for applying despread processing concurrently to the plurality N of discrete signals restored by the demultiplexing means to obtain in the order of time series the spectra of the power despreaded within the transmission bands thereof; phase discrimination means for obtaining a time point in which the power exceeds a prescribed threshold value under the spectra of the power and which corresponds to a path designated from outside, supplying the plurality N of prediction means with the time point as a common time point, and discriminating the time point as the phase of the sampling clock; and despreading means for applying despread processing based on a despreading code of the phase discriminated by the phase discrimination means to the N baseband signals generated by the plurality N of prediction means to obtain demodulation signals individually corresponding to the received signals having reached to the plurality N of antennas.

In such a radio receiver, since a receiving system adaptive to a direct sequence is realized and the despread processing is surely performed, the restriction on the mounting of the hardware is eased and the suppression of interference based on the sector zone configuration and the diversity receiving system becomes possible even in the cases where the number N of the antennas is large.

Furthermore, the foregoing objects can be achieved by the radio receiver wherein the plurality N of discrete signals restored by the demultiplexing means are despread processed and the power despreaded within the transmission bands resulting from the despread processing are measured, in the order of time series and in series.

In such a radio receiver, the path monitoring means are configured without mounting hardware or software for obtaining concurrently the spectra of the power of the respective received signals having reached concurrently to the plurality N of antennas.

As a result, the hardware of the radio receiver is reduced in dimension. Besides, even in the cases where the number N of the antennas to be mounted is large, the restriction on the mounting of the hardware is eased and the suppression of the interference based on the sector zone configuration and the diversity receiving system becomes possible.

Furthermore, the foregoing objects can be achieved by the radio receiver wherein the products of transfer functions showing the filtering characteristics to be used in prediction processing and a despreading code of the phase discriminated by the phase discrimination means is obtained by the multiplication means in advance, and despread processing along with the prediction processing is performed as the filter processing based on the filtering characteristics given in the form of the transfer functions equivalent to the products.

In such a radio receiver, the prediction processing and the despread processing are performed simultaneously, which eases the restriction on the mounting of the hardware and realizes the suppression of interference based on the sector zone configuration and the diversity receiving system even in the cases where the number N of the antennas to be mounted is large.

Furthermore, the foregoing objects can be achieved by the radio receiver wherein the despread processing and the measurement for the spectra of the power despreaded within the transmission bands resulting from despread processing are performed in the order of time series.

In such a radio receiver, the path monitoring means are configured without mounting the hardware or software for obtaining concurrently the spectra of the power of the received signals having reached concurrently to the antennas.

Accordingly, the hardware of the radio receiver is reduced in dimension. Besides, even in the cases where the number N of the antennas to be mounted is large, the restriction on the mounting of the hardware is eased and the suppression of the interference based on the sector zone configuration and the diversity receiving system becomes possible.

Besides, the foregoing objects can be achieved by the radio receiver wherein memory is equipped in which coefficients applicable to the interpolation processing and two values a despreading code takes are stored in advance, and the interpolation processing and the despread processing are performed concurrently by using the coefficients outputted by the memory in accordance with the logical value of the despreading code and the distinction information of the coefficients.

In such a radio receiver, since the despread processing is performed efficiently and simultaneously, the configuration of the hardware is simplified and the adaptation to higher chip rates becomes possible.

Moreover, the foregoing objects can be achieved by a despreader in which the interpolation processing and the despread processing are performed simultaneously by multipling the despreading code and the transfer functions showing the filtering characteristics to be applied in the interpolation processing in real time.

In such a despreader, as long as the errors such as rounding errors and truncation errors produced in the prediction processing and the despread processing are acceptably small, these processings are performed as a single combined processing of the two linear processings. This ensures the degree of freedom in the arrangement and the mounting of the hardware.

Furthermore, the foregoing objects can be achieved by the provision of a despreader in which a memory for storing in advance the products of the two values the despreading code may take and the transfer functions showing the filtering characteristics to be applied in the interpolation processing is equipped, and the interpolation processing and the despread processing are performed based on the filtering characteristics given in the form of products corresponding to the value of the despreading code and desired filtering characteristics among the products described above.

In such a despreader, since the despread processing is performed without using means for exclusively despread processing, the simplification of the hardware configuration and the adaptation to higher chip rates become possible.

Other objects and further features of the present invention are apparent in the following detailed description in conjunction with the accompanying drawings.

BRIEF DESCRIPTION OF THE DRAWINGS

In the accompanying drawings:

FIG. 8 is a diagram showing the information to be stored in ROMs and a mapping ROM;

DETAILED DESCRIPTION OF THE PREFERRED EMBODIMENT

First, the principle of radio receivers according to the present invention will be described with reference to FIG. 1.

Figure 1:
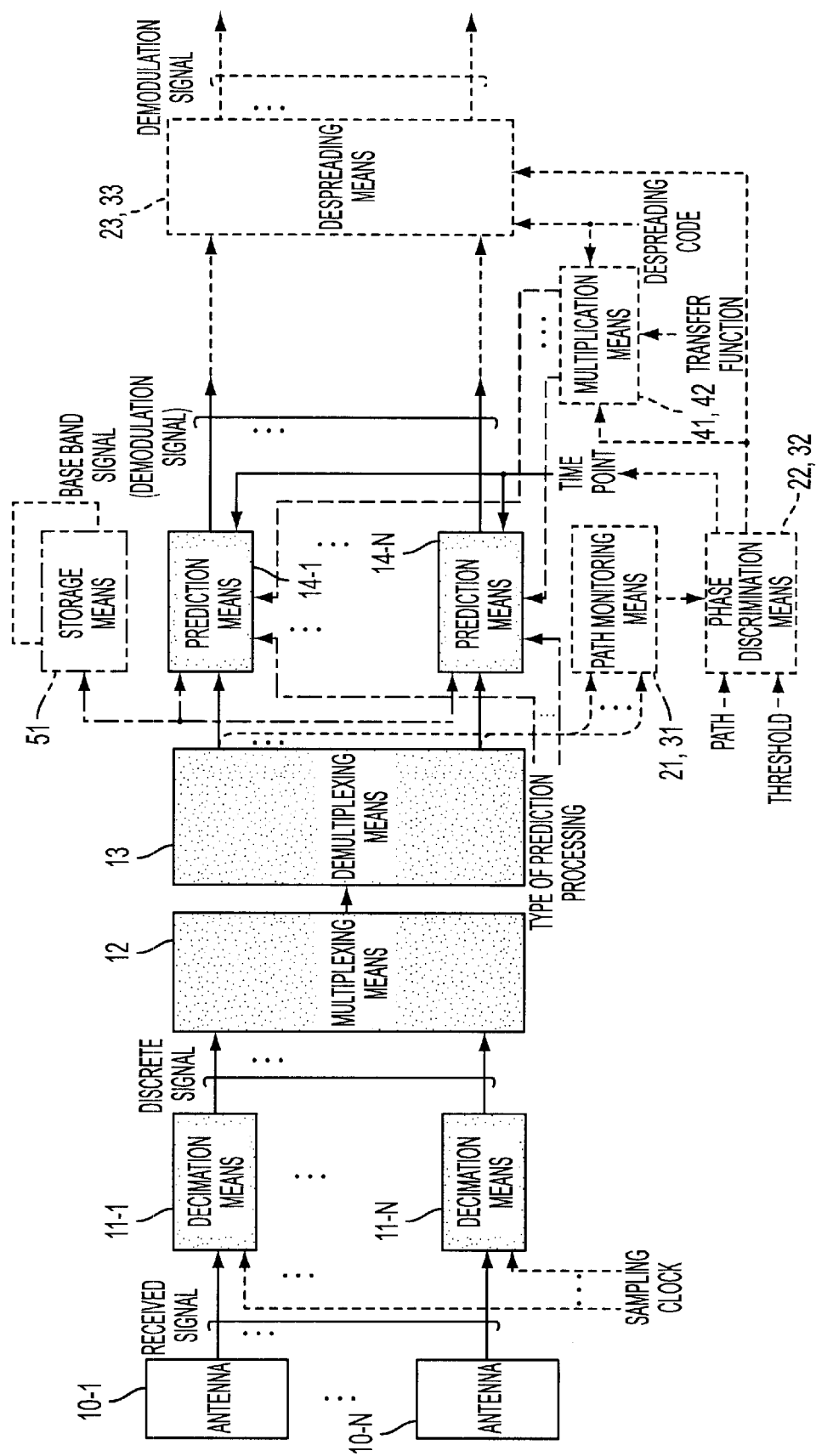
FIG. 1 is a block diagram showing the principle of the first through ninth radio receivers according to the present invention.

FIG. 1 is a diagram showing the principle of a first through ninth radio receivers according to the present invention.

The radio receiver shown in FIG. 1 is composed of: a plurality N of decimation means 11-1 to 11-N, to which received signals having reached concurrently to a plurality N of antennas 10-1 to 10-N are supplied in the baseband domain; a multiplexing means 12 and a demultiplexing means 13 cascade-connected at the subsequent stages of the decimation means 11-1 to 11-N; and a plurality N of prediction means 14-1 to 14-N individually connected to the N outputs of the demultiplexing means 13.

The principle of a first radio receiver according to the present invention is as follows.

In the plurality N of decimation means 11-1 to 11-N, the received signals having reached concurrently to the plurality N of antennas 10-1 to 10-N are sampled respectively in the baseband domain thereof at a plurality N of different phases and at a frequency of twice or more than the occupied bandwidth thereof, to generate discrete signals individually corresponding to the received signals. In the multiplexing means 12, the discrete signals generated by the plurality N of decimation means 11-1 to 11-N are multiplexed to output a multiple-signal. In the demultiplexing means 13, the multiple-signal outputted by the multiplexing means 12 is demultiplexed to restore the plurality N of discrete signals. In the plurality N of prediction means 14-1 to 14-N, the plurality N of discrete signals restored by the demultiplexing means 13 are prediction processed for individually predicting instantaneous values thereof at common time points given from outside or set in advance, to generate baseband signals which respectively show the received signals having reached concurrently to the plurality N of antennas 10-1 to 10-N.

The operation of the radio receiver of such configuration is as follows.

The decimation means 11-1 to 11-N generate discrete signals individually corresponding to the received waves having reached concurrently to the antennas 10-1 to 10-N by sampling the received signals respectively in the baseband domain thereof at the plurality N of different phases and at the frequency of twice or more than the occupied bandwidth thereof. The multiplexing means 12 multiplexes the discrete signals to output the multiple-signal.

The demultiplexing means 13 restores the above-mentioned plurality N of discrete signals by demultiplexing the multiple-signal. Then, the prediction means 14-1 to 14-N prediction processes for individually predicting instantaneous values thereof at the common time points given from outside or set in advance about the discrete signals, and generates the baseband signals respectively showing the received signals having reached concurrently to the antennas 10-1 to 10-N in the baseband domain.

In other words, the respective discrete signals described above are generated without sampling the instantaneous values to be interpolated in the prediction processing by the prediction means 14-1 to 14-N among the instantaneous values of the received signals having reached concurrently to the antennas 10-1 to 10-N, and multiplexed by the multiplexing means 12 before supplied to the demultiplexing means 13.

Accordingly, in the present invention, even in the cases where the number N of the antennas 10-1 to 10-N is large or the occupied bands of the received signals having reached to the antennas 10-1 to 10-N are wide, the band of the multiple-signal outputted by the multiplexing means 12 is held narrow, and the number of lines connecting the multiplexing means 12 and the demultiplexing means 13 is held below the number N of the antennas 10-1 to 10-N.

The principle of a second radio receiver according to the present invention will be described with reference to FIG. 1. in the following.

Received signals generated based on a direct sequence in which a spreading code of fc in chip rate reach to the antennas 10-1 to 10-N. The plurality N of decimation means 11-1 to 11-N sample the received signals having reached concurrently at the antennas 10-1 to 10-N in synchronization with a sampling clock below (½fc) in period.

The operation of the radio receiver of such configuration is as follows.

The discrete signals the decimation means 11-1 to 11-N individually generate by sampling the above-mentioned received signals are generated by sampling the received signals within the occupied bands thereof in the baseband domain at a period in which the sampling theorem holds.

Therefore, it becomes possible to apply the present invention to radio transmission systems to which direct sequence is applied.

The principle of the third radio receiver according to the present invention will be described with reference to FIG. 1.

In the plurality N of decimation means 11-1 to 11-N, the received signals having reached concurrently to the plurality N of antennas 10-1 to 10-N are sampled respectively at different phases set at regular intervals not greater than (½Nfc) on the time axis.

In the radio receiver of such configuration, N transfer functions showing the filtering characteristics to be applied individually in the prediction processing by the prediction means 14-1 to 14-N are set at regular intervals in phase space, also.

Accordingly, it becomes possible to simplify the algorithms for the calculation or to standardize the configuration of the hardware for actual use in the setting.

The principle of a fourth radio receiver according to the present invention will be described with reference to FIG. 1. in the following.

A path monitoring means 21 applies despread processing to the plurality N of discrete signals restored by the demultiplexing means 13, and concurrently obtains the spectra of the power despreaded within the transmission bands in the order of time series. A phase discrimination means 22 obtains a time point in which the power exceeds a given threshold value under the spectra of the power obtained by the path monitoring means 21 and which corresponds to a path designated from the outside, supplies the time point is supplied to the plurality N of prediction means 14-1 to 14-N as a common point, and is discriminated as the phase of the sampling clock. To the N baseband signals generated by the plurality N of prediction means 14-1 to 14-N, a despreading means 23 applies despread processing based on a despreading code of the phase discriminated by the phase discrimination means 22 to generate demodulation signals individually corresponding to the received signals having reached to the plurality N of antennas 10-1 to 10-N.

In the radio receiver of such configuration, a receiving system adaptive to a direct sequence is realized and the despread processing is surely performed; therefore, the restriction on the mounting of the hardware is eased even in the cases where the number N of the antennas 10-1 to 10-N is large. Besides, the application of desired synthetic processing to the modulation signals obtained through the despread processing enables the suppression of interference based on the sector zone configuration and the diversity receiving system.

The principle of a fifth radio receiver according to the present invention will be described with reference to FIG. 1. in the following.

In a path monitoring means 31, the plurality N of discrete signals restored by the demultiplexing means 13 are despread processed and the power despreaded within the transmission bands resulting from the despread processing, in the order of time series and in series are measured, to obtain the spectra of the measured power in the order of the time series in which the plurality N of decimation means 11-1 to 11-N perform the sampling. A phase discrimination means 32 obtains a time point in which the power exceeds a given threshold value under the spectra of the power obtained by the path monitoring means 31 and which corresponds to a path designated from the outside, supplies the time point to the plurality N of prediction means 14-1 to 14-N as a common point, and discriminates the time point as the phase of the sampling clock. In a despreading means 33, the N baseband signals generated by the plurality N of prediction means 14-1 to 14-N are despread processed based on a despreading code of the phase discriminated by the phase discrimination means 32 to obtain demodulation signals individually corresponding to the received signals having reached to the plurality N of antennas 10-1 to 10-N.

In the radio receiver of such configuration, the spectra of the power despreaded within the transmission bands resulting from the application of the despread processing to the plurality N of discrete signals restored by the demultiplexing means 13 are obtained by the path monitoring means 31 in the order of time series and in series. Thus, the path monitoring means 31 is configured without mounting the hardware or software for obtaining concurrently the spectra of the power of the respective received signals having reached concurrently to the antennas 10-1 to 10-N.

Therefore, the hardware of the radio receiver is reduced in dimension. Besides, even in the cases where the number N of the antennas 10-1 to 10-N is large, the restriction on the mounting of the hardware is eased and the suppression of the interference based on the sector zone configuration and the diversity receiving system becomes possible.

Hereinafter, the principle of a sixth radio receiver according to the present invention will be described with reference to FIG. 1.

The path monitoring means 21 applies despread processing to the plurality N of discrete signals restored by the demultiplexing means 13 concurrently, and obtains in the order of time series the spectra of the power despreaded within the transmission bands. The phase discrimination means 22 obtains a time point in which the power exceeds a given threshold value under the spectra of the power obtained by the path monitoring means 21 and which corresponds to a path designated from the outside, supplies the time point to the plurality N of prediction means 14-1 to 14-N as a common point, and discriminates the time point as the phase of the sampling clock. A multiplication means 41 obtains the products of the transfer functions showing the filtering characteristics to be used in the prediction processing and the despreading code of the phase discriminated by the phase discrimination means 22. The plurality N of prediction means 14-1 to 14-N filter process based on the filtering characteristics, which are given as transfer functions equal to the products obtained by the multiplication means 41, thereby applying despread processing along with prediction processing to the plurality N of discrete signals restored by the demultiplexing means 13, and generates demodulation signals individually corresponding to the. received signals having reached to the plurality N of antennas 10-1 to 10-N are obtained by this means.

In the radio receiver of such configuration, the prediction processing and the despread processing are performed under different configurations from those of the above-mentioned fourth and the fifth radio receivers according to the present invention; and this eases the restriction on the mounting of the hardware and realizes the suppression of the interference based on the sector zone configuration and the diversity receiving system even in the cases where the number of the antennas 10-1 to 10-N is large.

The principle of a seventh radio receiver according to the present invention will be described with reference to FIG. 1. in the following.

The path monitoring means 31 applies despread processing and the measurement for the power despreaded within the transmission bands resulting from the despread processing to the plurality N of discrete signals restored by the demultiplexing means 13 in the order of time series and in series, to obtain the spectra of the measured power in the order of the time series in which the plurality N of decimation means 11-1 to 11-N perform the sampling. The phase discrimination means 32 obtains a time point in which the power exceeds a given threshold value under the spectra of the power obtained by the path monitoring means 31 and which corresponds to a path designated from the outside, supplies the time point to the plurality N of prediction means 14-1 to 14-N as a common point, and discriminates the time point as the phase of the sampling clock. The multiplication means 42 obtains the products of the transfer functions showing the filtering characteristics to be used in the prediction processing and the despreading code of the phase discriminated by the phase discrimination means 32. The plurality N of prediction means 14-1 to 14-N apply despread processing along with prediction processing to the plurality N of discrete signals restored by the demultiplexing means 13 by filter processing based on the filtering characteristics given as transfer functions equal to the products obtained by the multiplication means 42, and obtains demodulation signals individually corresponding to the received signals having reached to the plurality N of antennas 10-1 to 10-N.

In the radio receiver of such configuration, the spectra of the power despreaded within the transmission bands resulting from the despread processing to the plurality N of discrete signals restored by the demultiplexing means 13 are obtained by the path monitoring means 31 in the order of time series and in series. Therefore, the path monitoring means 31 is configured without mounting the hardware or software for obtaining concurrently the spectra of the respective power of received signals having reached concurrently to the antennas 10-1 to 10-N.

Accordingly, the hardware of the radio receiver is reduced in dimension. Besides, even in the cases where the number N of the antennas 10-1 to 10-N is large, the restriction on the mounting of the hardware is eased and the suppression of the interference based on the sector zone configuration and the diversity receiving system becomes possible.

The principle of a eighth radio receiver according to the present invention will be described with reference to FIG. 1. in the following.

The path monitoring means 21 applies despread processing to the plurality N of discrete signals restored by the demultiplexing means 13 concurrently, and obtains in the order of time series the spectra of the power despreaded within the transmission bands. The phase discrimination means 22 obtains a time point in which the power exceeds a given threshold value under the spectra of the power obtained by the path monitoring means 21 and which corresponds to a path designated from the outside, supplies the time point to the plurality N of prediction means 14-1 to 14-N as a common point, and discriminates the time point as the phase of the sampling clock. With respect to binary the despreading code may take and the mode of the prediction processing the plurality N of prediction means 14-1 to 14-N may perform, a storage means 51 stores in advance the products of all the combinations between opposite-signed constants individually corresponding to the two values and transfer functions showing the filtering characteristics to be used in the prediction processing. The plurality N of prediction means 14-1 to 14-N apply despread processing along with the prediction processing to the plurality N of discrete signals restored by the demultiplexing means 13 by filter processing based on the filtering characteristics, which are given as transfer functions equal to the products corresponding to the logical values of the despreading codes given in series and the mode of the prediction processing given from theoutside, and obtain demodulation signals individually corresponding to the received signals having reached to the plurality N of antennas 10-1 to 10-N.

In the radio receiver of such configuration, the despread processing is performed not via the above-mentioned despreading means 22, 23 or multiplication means 41, 42, but via the prediction means 14-1 to 14-N. This simplifies the configuration of the hardware and enables the adaptation to higher chip rates.

The principle of a ninth radio receiver according to the present invention will be described with reference to FIG. 1. in the following.

The path monitoring means 31 applies despread processing and the measurement for the power despreaded within the transmission bands resulting from the despread processing to the plurality N of discrete signals restored by the demultiplexing means 13, in the order of time series and in series, to obtain the spectra of the measured power in the order of the time series in which the plurality N of decimation means 11-1 to 11-N perform the sampling. The phase discrimination means 32 obtains a time point in which the power exceeds a given threshold value under the spectra of the power obtained by the path monitoring means 31 and which corresponds to a path designated from the outside, supplies the time point to the plurality N of prediction means 14-1 to 14-N as a common point, and discriminates the time point as the phase of the sampling clock. With respect to the binary the despreading code may take and the mode of the prediction processing the plurality N of prediction means 14-1 to 14-N may perform, the storage means 51 stores in advance the products of all the combinations between opposite-signed constants individually corresponding to the two values and transfer functions showing the filtering characteristics to be used in the prediction processing. The plurality N of prediction means 14-1 to 14-N apply despread processing along with the prediction processing to the plurality N of discrete signals restored by the demultiplexing means 13 by filter processing based on the filtering characteristics, which are given as transfer functions equal to the products corresponding to both the logical values of the despreading codes given in series and the mode of the prediction processing given from the outside, and obtain demodulation signals individually corresponding to the received signals having reached to the plurality N of antennas 10-1 to 10-N.

In the radio receiver of such configuration, the spectra of the power despreaded within the transmission bands resulting from the application of the despread processing to the plurality N of discrete signals restored by the demultiplexing means 13 are obtained by the path monitoring means 31 in the order of time series and in series. Therefore, the path monitoring means 31 is configured without mounting the hardware or software for obtaining concurrently the spectra of the respective power of received signals having reached concurrently to the antennas 10-1 to 10-N.

This, accordingly, reduces the hardware in dimension and enables the adaptation to higher chip rates.

The principle of a first despreader according to the present invention will be described with reference to FIG. 2. in the following.

Figure 2:
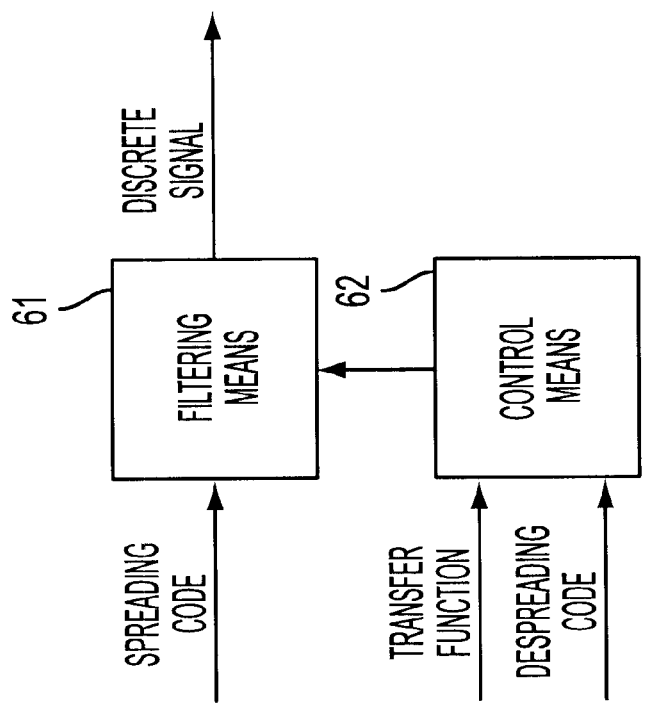
FIG. 2 is a block diagram showing the principle of the first despreader according to the present invention.

FIG. 2 is a. diagram showing the principle of a first despreader according to the present invention.

The despreader shown in FIG. 2 is composed of a filtering means 61 and a control means 62 for supplying a transfer function to the filtering means 61.

The principle of the first despreader according to the present invention is as follows.

The filtering means 61 applies prediction processing and despread processing to a spreading signal, which is generated by sampling a received signal of a direct sequence at the frequency twice or more than the chip rate of the spreading signal in the baseband domain thereof, and generate a demodulation signal. The control means 62 obtains the product between a transfer function showing the filtering characteristics to be applied in the prediction processing and a despreading code to be applied in the despread processing, and supplies the filtering means 61 with the product as the transfer function of the filtering means 61.

The operation of the despreader of such configuration is as follows. With respect to a spreading signal obtained by sampling a received signal of a direct sequence at a frequency twice or more the chip rate of the spreading code in the baseband domain, the control means 62 obtains the product of a transfer function showing the filtering characteristics to be applied in the prediction processing applied to the spreading signal and a despreading code to be applied in despread processing applied concurrently with the prediction processing. In addition, the control means 62 supplies the filtering means 61 with the product as the transfer function showing the filtering characteristics of the filtering means 61. The filtering means 61 generates a demodulation signal by applying filter processing based on the transfer function given as described above to the above-mentioned spreading signal.

In other words, the above-mentioned prediction processing and despread processing are achieved under the filtering characteristics shown as a single transfer function obtained in advance based on the linearity of the processings.

Accordingly, in such hardware for prediction processing and despread processing, the degree of freedom on its arrangement and mounting is ensured as long as errors such as a rounding error and a truncation error produced in the processings are acceptably small.

The principle of a second despreader according to the present invention will be described with reference to FIG. 3. in the following.

Figure 3:
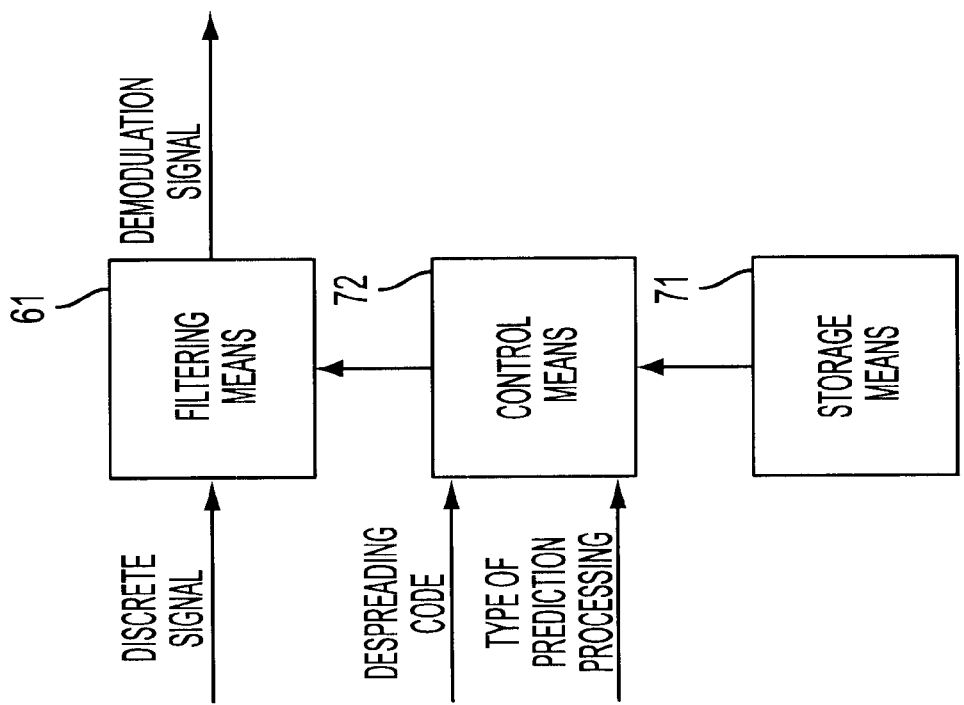
FIG. 3 is a block diagram showing the principle of the second despreader according to the present invention.

FIG. 3 is a block diagram showing the principle of the second despreader according to the present invention.

The despreader shown in FIG. 3 is composed of a filtering means 61, a storage means 71 in which prescribed parameters are stored in advance, and a control means 72 for supplying the filtering means 61 with a transfer function in accordance with the parameters stored in the storage means.

The principle of the second despreader according to the present invention is as follows.

The filtering means 61 applies prediction processing and despread processing to a spreading signal, which is obtained by sampling a received signal of a direct sequence at the frequency of twice or more than the chip rate of the spreading signal in the baseband domain thereof, to generate a demodulation signal. With respect to the binary the despreading code may take and the mode of the prediction processing, the storage means 71 stores in advance the products of all the combinations between opposite-signed constants individually corresponding to the binary and transfer functions showing the filtering characteristics to be used in the prediction processing. The control means 72 supplies the products corresponding to the logical values of despreading codes to be applied in the despread processing and the mode of the prediction processing supplied along with the logical values, among the products stored in the storage means 71, to the filtering means 61 as its transfer functions.

In the despreader of such configuration, since the despread processing is mainly performed without using means for exclusively despread processing, the simplification of the hardware configuration and the adaptation to higher chip rates become possible.

Embodiments of the present invention will be described in detail with reference to the accompanying drawings in the following.

Figure 4:
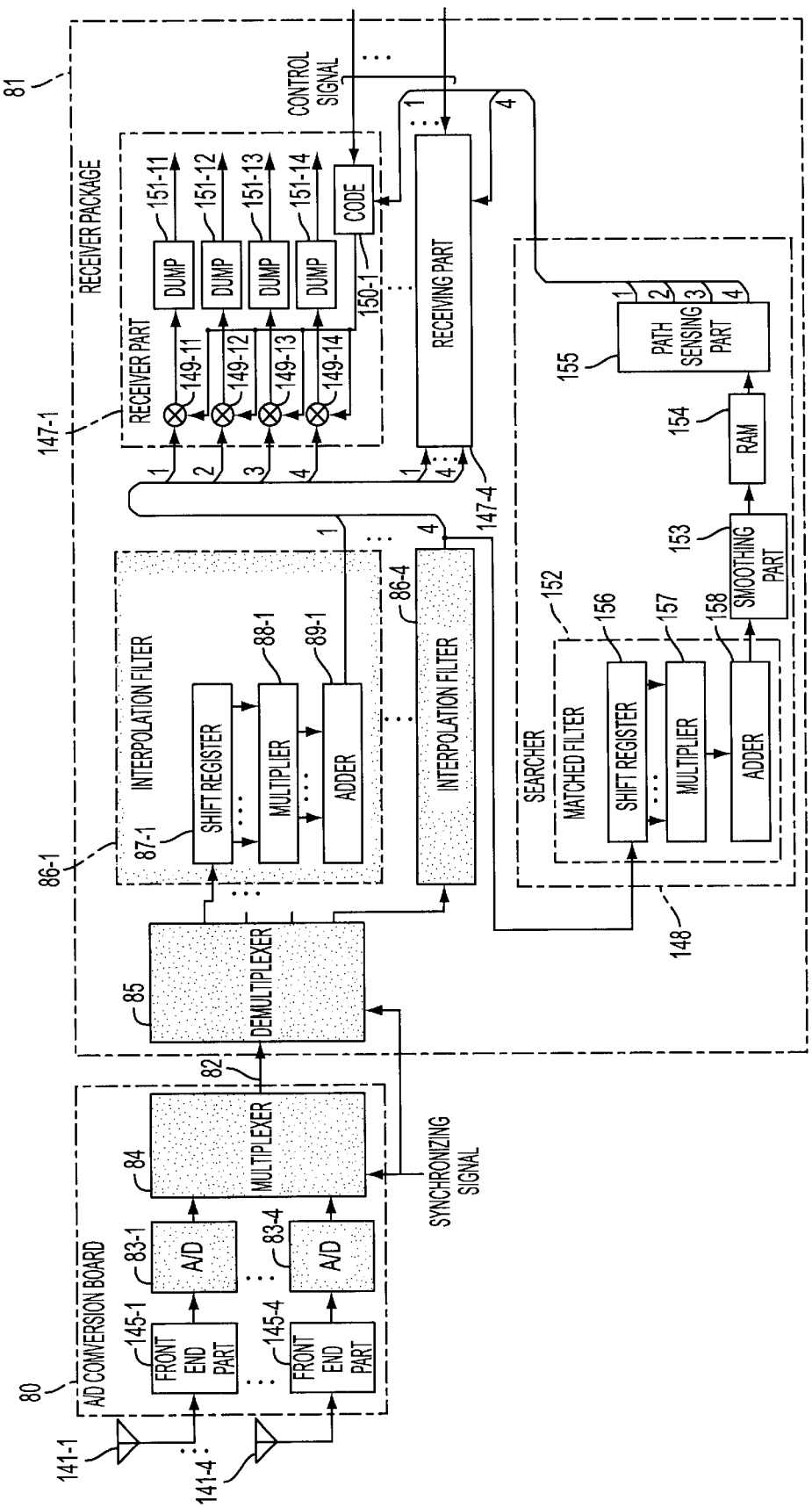
FIG. 4 is a block diagram showing the first embodiment of the first through fourth radio receivers according to the present invention.

FIG. 4 is a block diagram showing the first embodiment of the first through fourth radio receivers according to the present invention.

Figure 14:
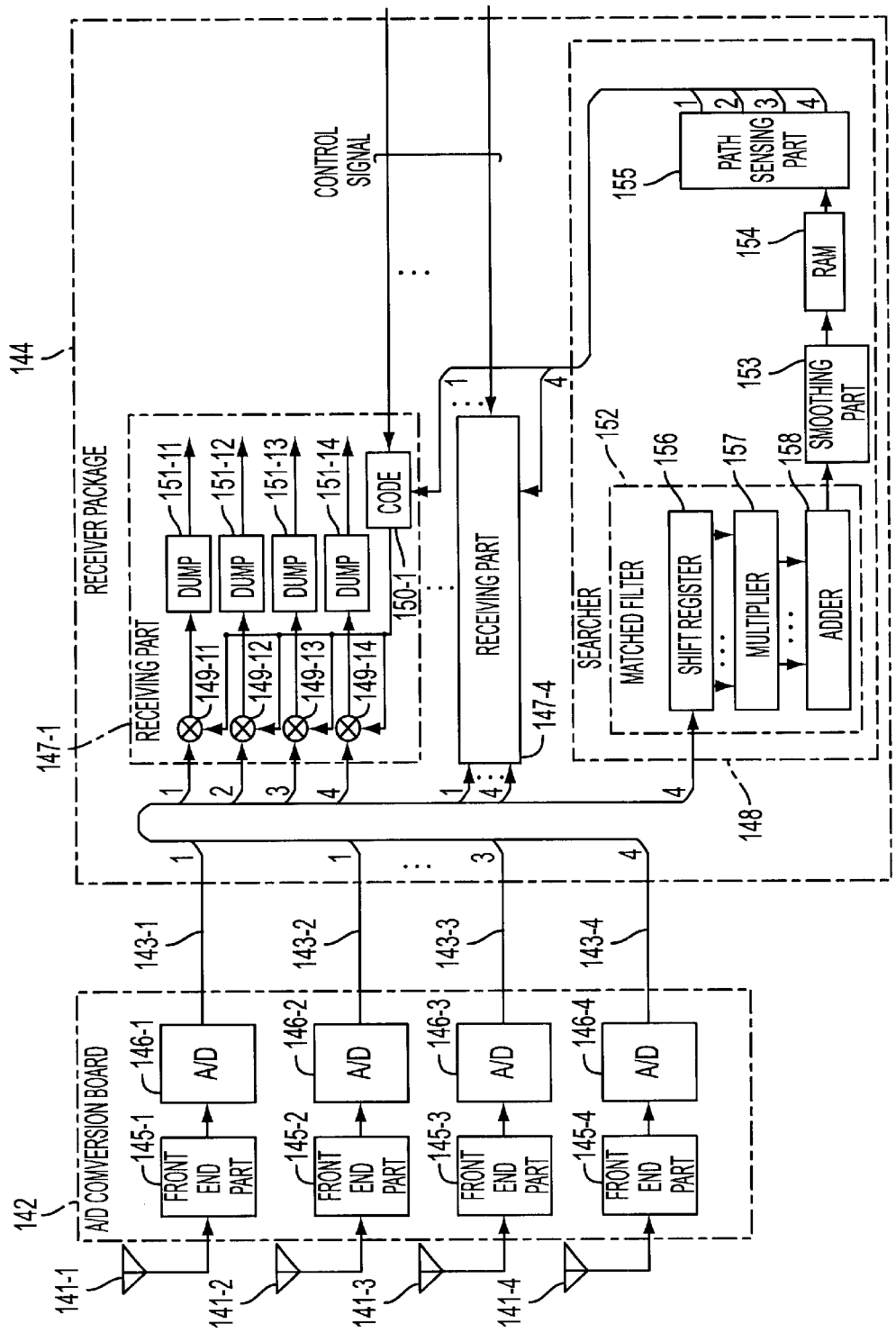
FIG. 14 is a block diagram showing an example of a configuration of a receiving system in a mobile communication system to which the CDMA system is applied.
Figure 15:
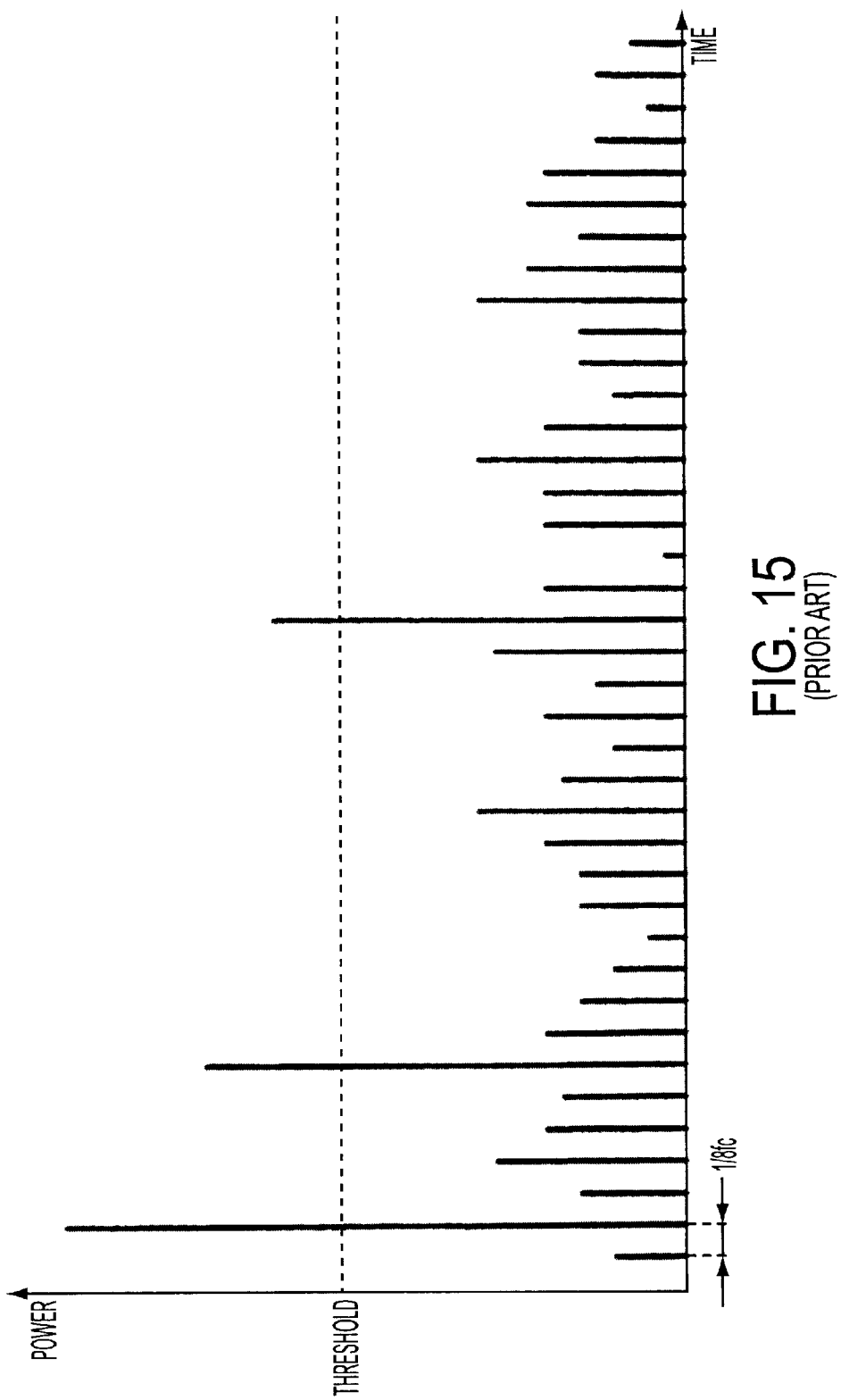
FIG. 15 is a diagram showing an example of a delay profile.

In the diagram, parts having the same functions and configuration as those shown in FIG. 14 are designated by like numerals, and the description thereof will be omitted here.

The configurational differences between the present embodiment and the conventional example shown in FIG. 14 are that: an A/D conversion package 80 is equipped in place of the A/D conversion package 142; a receiver package 81 is equipped in place of the receiver package 144; and the A/D conversion package 80 is connected to the receiver package 81 via a single line 82 equipped in place of the lines 143-1 to 143-4.

The configurational differences between the A/D conversion package 80 and the A/D conversion package 142 are that: A/D converters (A/D) 83-1 to 83-4 are equipped in place of the A/D converters 146-1 to 146-4; and a multiplexer 84, which a synchronizing signal is supplied to the control terminal from the outside, is equipped at the subsequent stages of the A/D converters 83-1 to 83-4 as the final stage.

The configurational differences between the receiver package 81 and the receiver package 144 are that: a demultiplexer 85 having a demultiplexing input connected to the line 82 and a control terminal, which the aforementioned synchronizing signal is supplied to, is equipped; interpolation filters 86-1 to 86-4 individually arranged between the four outputs of the demultiplexer 85 and the receiving parts 147-1 to 147-4 are equipped; and the input of the matched filter 152 arranged at the first stage of the searcher 148 is directly connected to the output of the interpolation filter 86-4.

The interpolation filer 86-1 is composed of: a shift register 87-1 arranged at the first stage and having 31 stages of ($\frac{1}{8}fc$) in delay time by stage; a multiplier 88-1 which is supplied with discrete signals composed of binary digit strings obtained at the input terminal and the respective outputs of the shift register 87-1 concurrently and with 31 coefficients showing the after-mentioned transfer function (not shown in the block diagram); and an adder 89-1 connected to the 31 outputs of the multiplier 88-1 and arranged as the final stage.

In connection to this, since the interpolation filters 86-2 to 86-4 are the same as the interpolation filter 86-1 in configuration, the corresponding components are hereinafter designated by like numerals with an index number of "2" to "4", respectively, and the descriptions and diagrams thereof will be omitted here.

As for the correspondence between the present embodiment and the block diagram shown in FIG. 1: antennas 141-1 to 141-5 correspond to the antennas 10-1 to 10-N; front end parts 145-1 to 145-5 and the A/D converter 83-1 to 83-4 correspond to the decimation means 11-1 to 11-N; the multiplexer 84 corresponds to the multiplexing means 12; the demultiplexer 85 corresponds to the demultiplexing means 13; the interpolation filter 86-1 to 86-4 correspond to the prediction means 14-1 to 14-N; the matched filter 152, a smoothing part 153, and a RAM 154 correspond to the path monitoring means 21; a path sensing part 155 corresponds to the phase discrimination means 22; and receiving parts 147-1 to 147-4 correspond to the despreading means 23.

The operation of the present embodiment will be described in the following.

Figure 5:
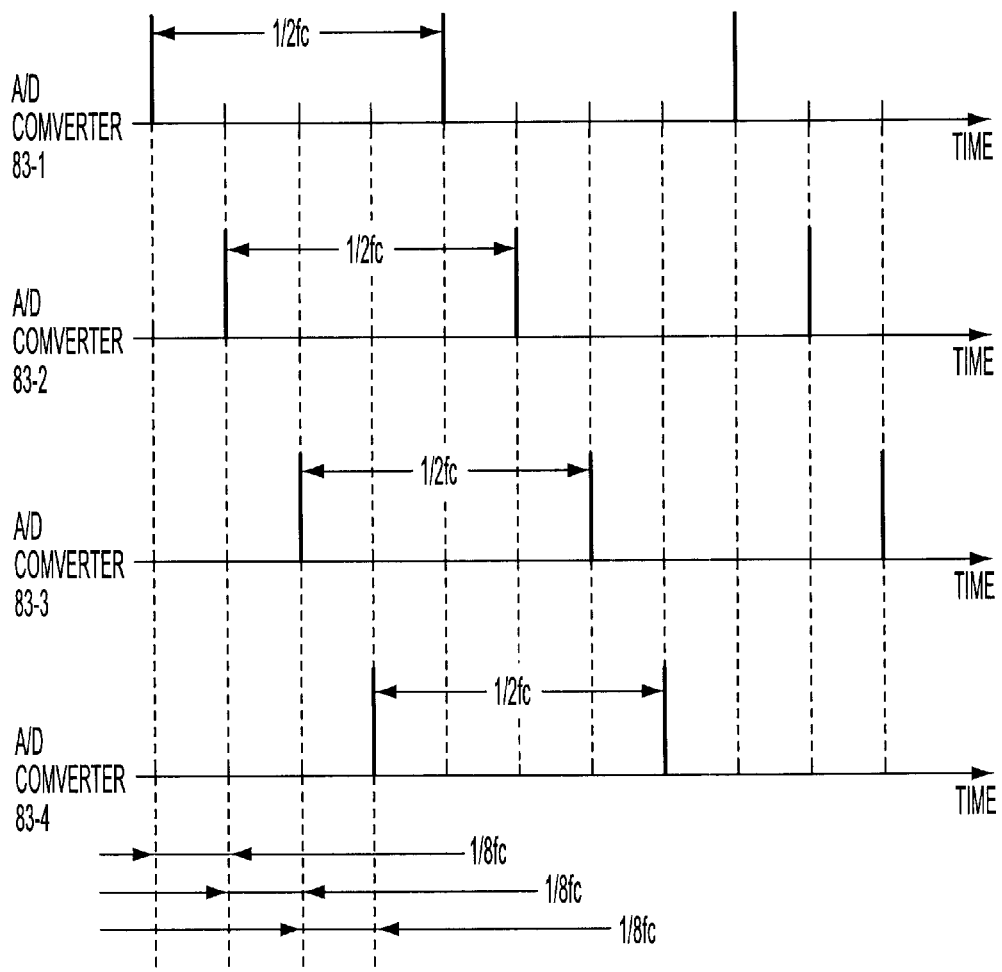
FIG. 5 is a time chart explaining the time points at which A/D converters perform sampling.

In the A/D conversion package 80, the A/D converters 83-1 to 83-4 accept spreading signals obtained by the front end parts 145-1 to 145-4, respectively,and individually generate discrete signals by over-sampling the spreading signals re-cyclically at a period (=$\frac{1}{2}fc$; hereinafter, referred to as "decimation sampling period") four times the aforementioned over-sampling period (=$\frac{1}{8}fc$) without overlapping on the time axis, as shown in FIG. 5.

The multiplexer 84 generates a multiplexed discrete signal by multiplexing the discrete signals generated by the A/D converters 83-1 to 83-4 as described above on the time axis in synchronization with the synchronizing signal, and sends the multiplexed discrete signal through the line 82.

Then, in the receiver package 81, the demultiplexer 85 restores the above-mentioned four discrete signals by applying demultiplexing processing, which is inversive to the multiplexing processing performed to the multiplexed discrete signal by the multiplexer 84 as mentioned before, and supplies the discrete signals to the interpolation filters 86-1 to 86-4, respectively.

Figure 6A:
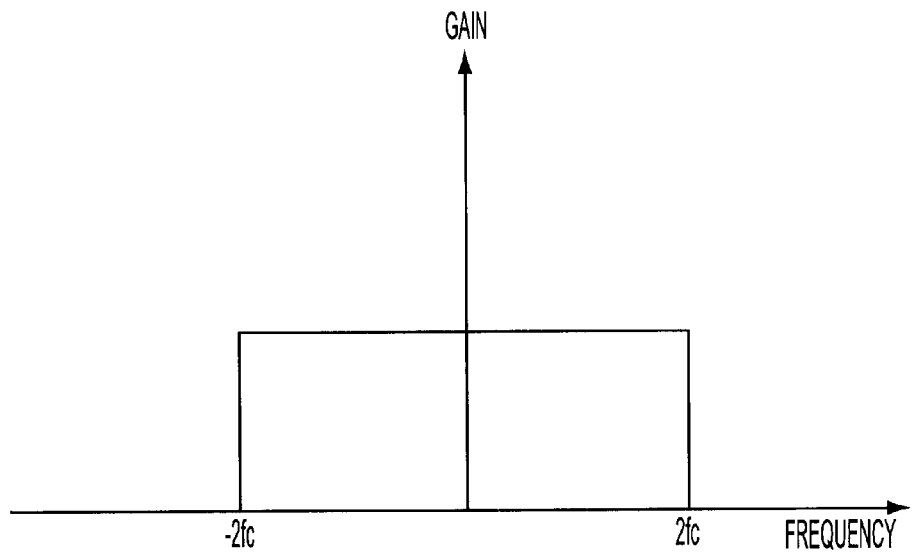
FIG. 6 is a diagram showing the coefficients to be set in interpolation filters.
Figure 6B:
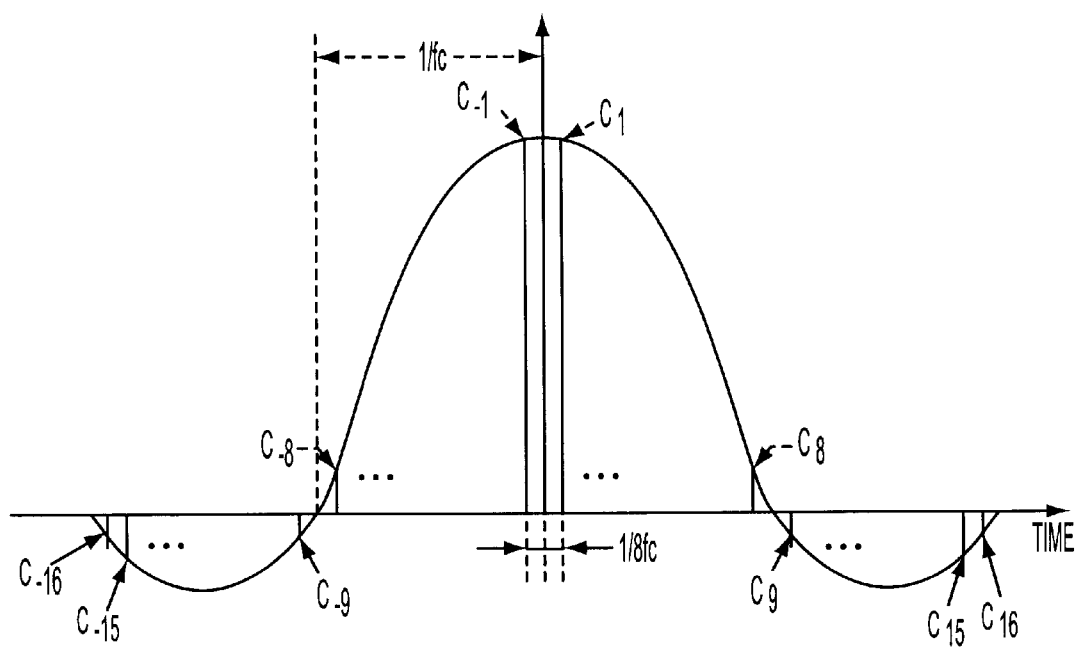

Besides, to the multipliers 88-1 to 88-4 composing the interpolation filters 86-1 to 86-4 are supplied in common a transfer function composed of a coefficient sequence C defined by:

$C_{-16}, C_{-15}, \ldots, C_{-1}, C_1, C_1, C_2, \ldots, C_{16}$, wherein a time function $C_n$=f(n/8fc) is defined as the fourier transformation (FIG. 6(b)) of a frequency function (FIG. 6(a)) which shows an ideal rectangular pass band and is equivalent to the quadruple of the chip rate fc (hereinafter, referred to as "decimation sampling frequency") in bandwidth in the baseband domain.

In addition, the interpolation filters 86-1 to 86-4 are operated as transversal filters (composed of the shift registers 87-1, the multiplier 88-1 and the adder 89-1 in the case of the interpolation filter 86-1, for example) having the transfer function given in the form of the coefficient sequence C.

In other words, in the interpolation filters 86-1 to 86-4 (the adder 89-1 to 89-4), the four discrete signals generated in the over-sampling by the A/D conversion package 80 at the decimation sampling periods are respectively have instantaneous values which actually are not contained on the time axis interpolated every (⅛fc), and supplied to the four inputs of the receiving parts 147-1 to 147-4.

In connection to this, since the operation of the receiving parts 147-1 to 147-4 and the searcher 148 is the same as that of the conventional example, the description thereof will be omitted here.

As described above, according to the present embodiment, the discrete signals generated by the A/D conversion package 80 under different phases and a common decimation-sampling period is multiplexed when sent through the transmission line 82. In the receiver package 81 being opposed via the transmission line 82, the discrete signals are restored under the demultiplex processing by the demultiplexer 85 and the interpolation processing (prediction processing) by the interpolation filters 86-1 to 86-4, and supplied to the receiving parts 147-1 to 147-4 concurrently.

As a result, according to the present embodiment, the number of lines to be formed between the A/D conversion package 80 and the receiver package 81 is reduced below the number of the antennas 144-1 to 144-4, and the transmission performance thereof is maintained high as long as the deviation in the accuracy of the interpolation processing (prediction processing) by the interpolation filters 86-1 to 86-4 is acceptable.

Figure 7:
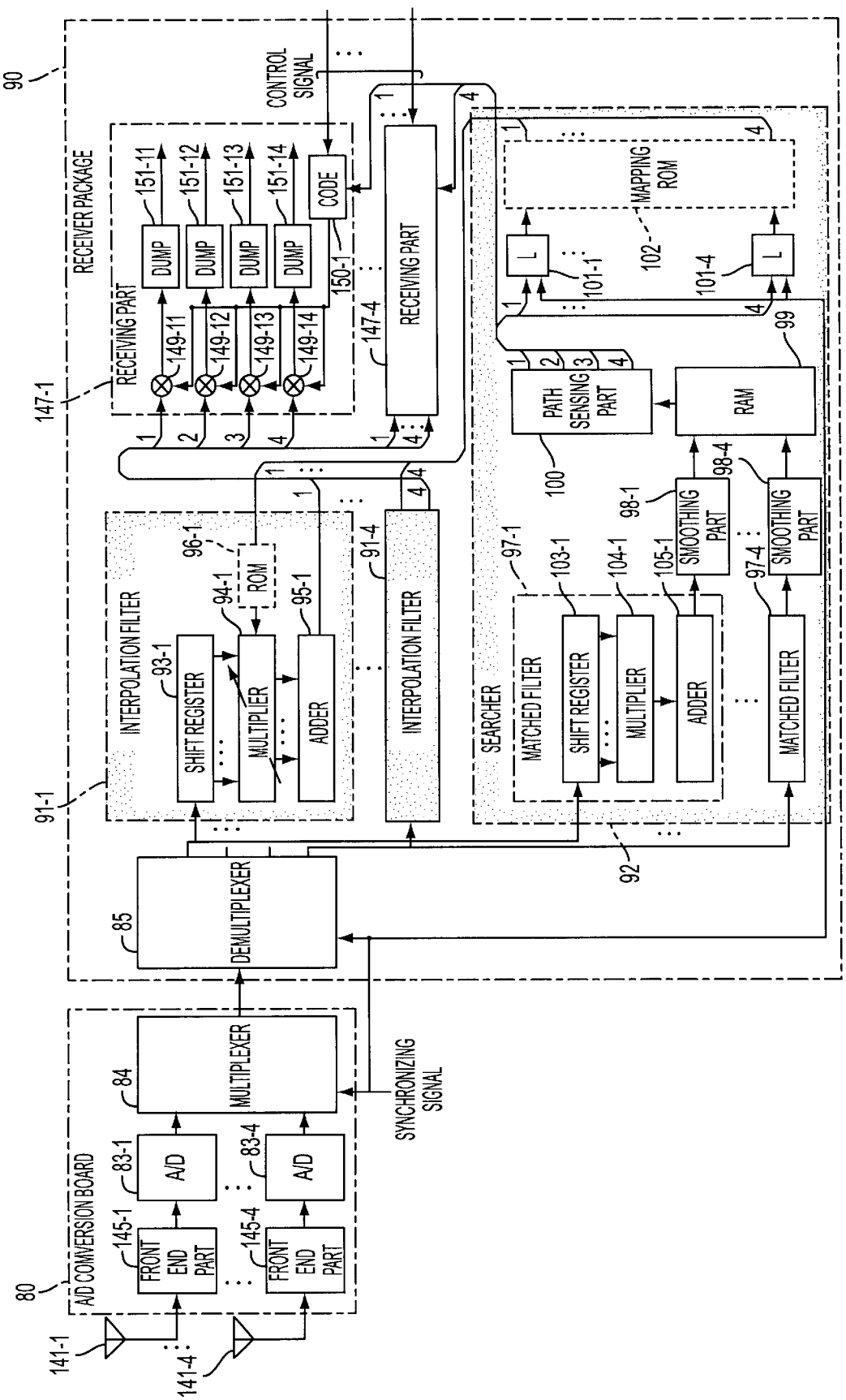
FIG. 7 is a block diagram showing a second embodiment of the first through fourth radio receivers according to the present invention.

FIG. 7 is a block diagram showing the second embodiment of the first through fourth radio receivers according to the present invention.

In the diagram, parts having the same functions and configuration as those shown in FIG. 4 are designated by like numerals, and the description thereof will be omitted here.

The configurational difference between the present embodiment and the embodiment shown in FIG. 4 consists in the configuration of a receiver package 90 equipped in place of the receiver package 81.

The configurational differences between the receiver package 90 and the receiver package 81 are that: interpolation filters 91-1 to 91-4 are equipped in place of the interpolation filters 86-1 to 86-4; and a searcher 92 arranged between the four outputs of the demultiplexer 85 and the coefficient input terminals of the interpolation filters 91-1 to 91-4 is equipped in place of the searcher 148.

The interpolation filer 91-1 is composed of: a shift register 93-1 arranged at the first stage and having 7 stages of (½fc) in delay time by stage; a multiplier 94-1 to which discrete signals composed of binary digit strings obtained at the input terminal and respective outputs of the shift register 87-1 are supplied in parallel; an adder 95-1 connected to the 8 outputs of the multiplier 94-1 and arranged as the final stage; and a ROM 96-1 having an input connected to the corresponding output of the searcher 92 and an output connected to the coefficient input,of the multiplier 94-1.

In connection to this, since the interpolation filters 91-2 to 91-4 are the same as the interpolation filter 91-1 in configuration, the corresponding components are hereinafter designated by like numerals with an index number of "2" to "4", respectively, and the descriptions and diagrams thereof will be omitted here.

The configurational differences between the searcher 92 and the searcher 148 are that: matched filters 97-1 to 97-4 individually direct-connected to the four outputs of the demultiplexer 85 are equipped in place of the matched filter 152; smoothing parts 98-1 to 98-4 individually cascade-connected to the matched filters 97-1 to 97-4 are equipped in place of the smoothing part 153, a RAM 99 directly connected to the outputs of the smoothing parts 98-1 to 98-4 is equipped in place of the RAM 154; a path sensing part 100 is equipped in place of the path sensing part 155; latches (L) 101-1 to 101-4 having clock inputs connected to the first through fourth outputs of the path sensing parts 100 individually and data inputs to which a synchronizing signal is supplied concurrently are equipped; and a mapping ROM 102-1 is arranged at the stage between the outputs of the latches 101-1 to 101-4 and the inputs of the ROM 96-1 to 96-4 equipped in the interpolation filter 91-1 to 91-4.

The configurational differences between the matched filter 97-1 and thematched filter 152 are that: a shift register 103-1 which is (2L−1) in the number of stages with respect to the word length L of a despreading code and is (½fc) in delay time by stage is equipped in place of the shift register 156; a multiplier 104-1 for multiplying the input and outputs of all the stages of the shift register 103-1 by the aftermentioned weight is equipped in place of the multiplier 157; and an adder 105-1 arranged at the subsequent stage of the multiplier 104-1 as the final stage is equipped in place of the adder 158.

In connection to this, since the interpolation filters 97-2 to 97-4 are the same as the interpolation filter 97-1 in configuration, the corresponding components are designated by like numerals with an index number of "2" to "4", respectively in the following, and the descriptions and diagrams thereof will be omitted here.

In addition, the correspondence between the present embodiment and the block diagram shown in FIG. 1 is the same as the correspondence in the embodiment shown in FIG. 4, with exceptions in that: the interpolation filters 91-1 to 91-4 correspond to the prediction means 14-1 to 14-N; the matched filters 97-1 to 97-4, the smoothing parts 98-1 to 98-4, and the RAM 99 correspond to the path monitoring means 21; and the path sensing part 100, the latches 101-1 to 101-4, and the mapping ROM 102 correspond to the phase discrimination means 22.

The operation of the present.embodiment is as follows.

In the receiver package 90, the ROM 96-1 to 96-4 equipped in the interpolation filter 91-1 to 91-4 store in advance the following four coefficient sequences (1) to (4) defined by:

(1) $C_{-16}, C_{-12}, C_{-8}, C_{-4}, C_1, C_5, C_9, C_{13}$
(2) $C_{-15}, C_{-11}, C_{-7}, C_{-3}, C_2, C_6, C_{10}, C_{14}$
(3) $C_{-14}, C_{-10}, C_{-6}, C_{-2}, C_3, C_7, C_{11}, C_{15}$
(4) $C_{-13}, C_{-9}, C_{-5}, C_{-1}, C_4, C_8, C_{12}, C_{16}$, with respect to the aforementioned function $C_n=f(n/8fc)$ as shown in FIG. 8(a).

Besides, the mapping ROM 102 equipped in the searcher 92 has distinction information showing the unique coefficient sequences respectively corresponding to the values "0" to "3" given as the synchronizing signal, among the above-mentioned coefficient sequences (1) to (4), as shown in FIG. 8(b) stored in advance. (For ease of description, it is assume that the distinction information is one of "(1)" to "(4)".)

In the searcher 92 equipped in the receiver package 90, the shift registers 103-1 to 103-4 sequentially store the four discrete signals restored by the demultiplexer 85 concurrently, and the multipliers 104-1 to 104-4 and the adders 105-1 to 105-4 re-cyclically correlate the stored discrete signals to a despreading code given as the aforementioned weight in advance.

Figure 9:
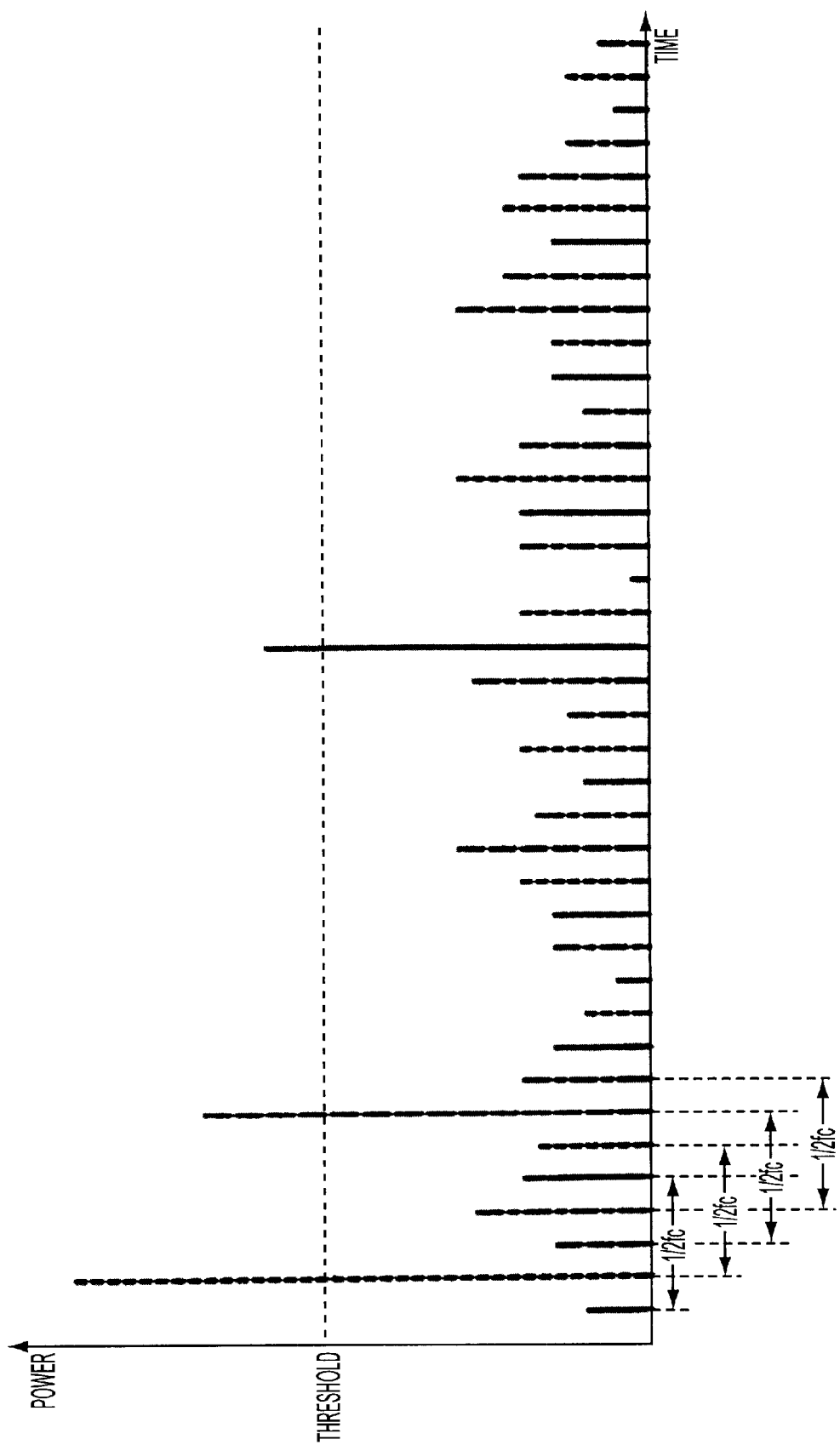
FIG. 9 is a diagram showing an example of a delay profile detected by a searcher.

The smoothing parts 98-1 to 98-4 obtain a delay profile composed of a set of power spectra given at intervals of (½fc) on the time axis, as shown by full lines, dotted lines, broken lines, and dashed lines in FIG. 9 by obtaining, and the averages of the results of the above-mentioned correlation by every period of the despreading code in the order of time series, over a period of twice or more than the period of the despreading code, and then stores the delay profile in the RAM 99.

The path sensing part 100 outputs re-cyclically a "path detection signal," which is composed of pulse train showing time points in which the averaged value exceeding a predetermined threshold value is detected, at the period of the despreading codes, among the aforementioned sequences showing the power, by reading out the delay profile thus stored in the RAM 99 in the order of time series and in synchronization with the despreading code.

In connection to this, since the receiving parts 147-1 to 147-4 are operated in accordance with the path detection signals basically in the same manner as the conventional example, the description on the operation of the receiving parts 147-1 to 147-4 will be omitted here.

Besides, the latches 101-1 to 101-4 are, concurrently, supplied with the synchronizing signals showing which discrete signals among those generated by the A/D converters 83-1 to 83-4 the discrete signal being restored by the demultiplexer 85 is, and hold the value of the synchronizing signal (one of "0" to "3") at the time point in which the above-mentioned path detection signal is outputted by the path sensing part 100.

When the value of the synchronizing signal is held in any one latch among the latches 101-1 to 101-4 (hereinafter, referred to as "active latch," for ease of description) as described above, the mapping ROM 102 obtains the distinction information corresponding to the value from among the previously stored distinction information (1) to (4). Then, the mapping ROM 102 supplies the distinction information to the interpolation filter (hereinafter, referred to as "active interpolation filter"; also, assume that "the interpolation filter 91-1" is the active interpolation filter, for ease of description) corresponding to the above-mentioned active latch among the interpolation filters 91-1 to 91-4.

In the active interpolation filter 91-1, because the ROM 96-1 reads out the coefficient sequence corresponding to the distinction information among the previously stored coefficient sequences, and supplies it to the multiplier 94-1, the interpolation filter 91-1 is operated as a transversal filter having the transfer function given in the form of the coefficient sequence.

As a result, according to the present embodiment, in the interpolation filters 91-1 to 91-4, the four discrete signals generated in over-sampling by the A/D conversion package 80 are interpolated in phase space for instantaneous values at the time points in which the "path detection signal" is supplied by the path sensing part 100 among the instantaneous values which actually are not contained in the discrete signals, by switching the coefficients to the respective multipliers 94-1 to 94-4, and are supplied to the four inputs of the receiving parts 147-1 to 147-4 concurrently. In comparison of the present embodiment with the embodiment shown in FIG. 4, the searcher 92 is equipped with the latches 101-4 to 101-4 and mapping ROM 102, which are not equipped in the searcher 148, and the interpolation filters 91-1 to 91-4 are equipped with the ROMS 96-1 to 96-4, which are not equipped in the interpolation filters 86-1 to 86-4.

However, the total sum of the stage numbers of the shift registers 93-1 to 93-4 equipped in the interpolation filter 91-1 to 91-4 and the hardware dimension of the multipliers 94-1 to 94-4 and adders 95-1 to 95-4 are equivalent to nearly "¼" $(=((⅛fc)/(½fc)))$ the total sum of the stage numbers of the shift registers 87-1 to 87-4 equipped in the interpolation filters 86-1 to 86-4 and the hardware dimension of the multipliers 88-1 to 88-4 and adders 89-1 to 89-4, respectively.

Besides, the sum of the stage numbers of the shift registers 103-1 to 103-4 equipped in the matched filters 97-1 to 97-4 and the hardware dimension of the multipliers 104-1 to 104-4 and adders 105-1 to 105-4 are approximately equal to the stage number of the shift register 156 equipped in the matched filter 152 and the hardware dimension of the multiplier 157 and adder 158, respectively.

The smoothing parts 98-1 to 98-4 are larger in hardware dimension compared to the smoothing part 153; however, the spread of the major operations in the interpolation filters 91-1 to 91-4 and searcher 92 become "¼" $(=((⅛fc)/(½fc)))$ the speed of the like operations in the interpolation filters 86-1 to 86-4 and searcher 148.

Accordingly, in the present embodiment, an increase in hardware scale is not considerably large and the speed of the operation becomes small, compared to the embodiment shown in FIG. 4. This eases the restrictions on the EMI along with those on the integration into LSIs and on the mounting.

Figure 10:
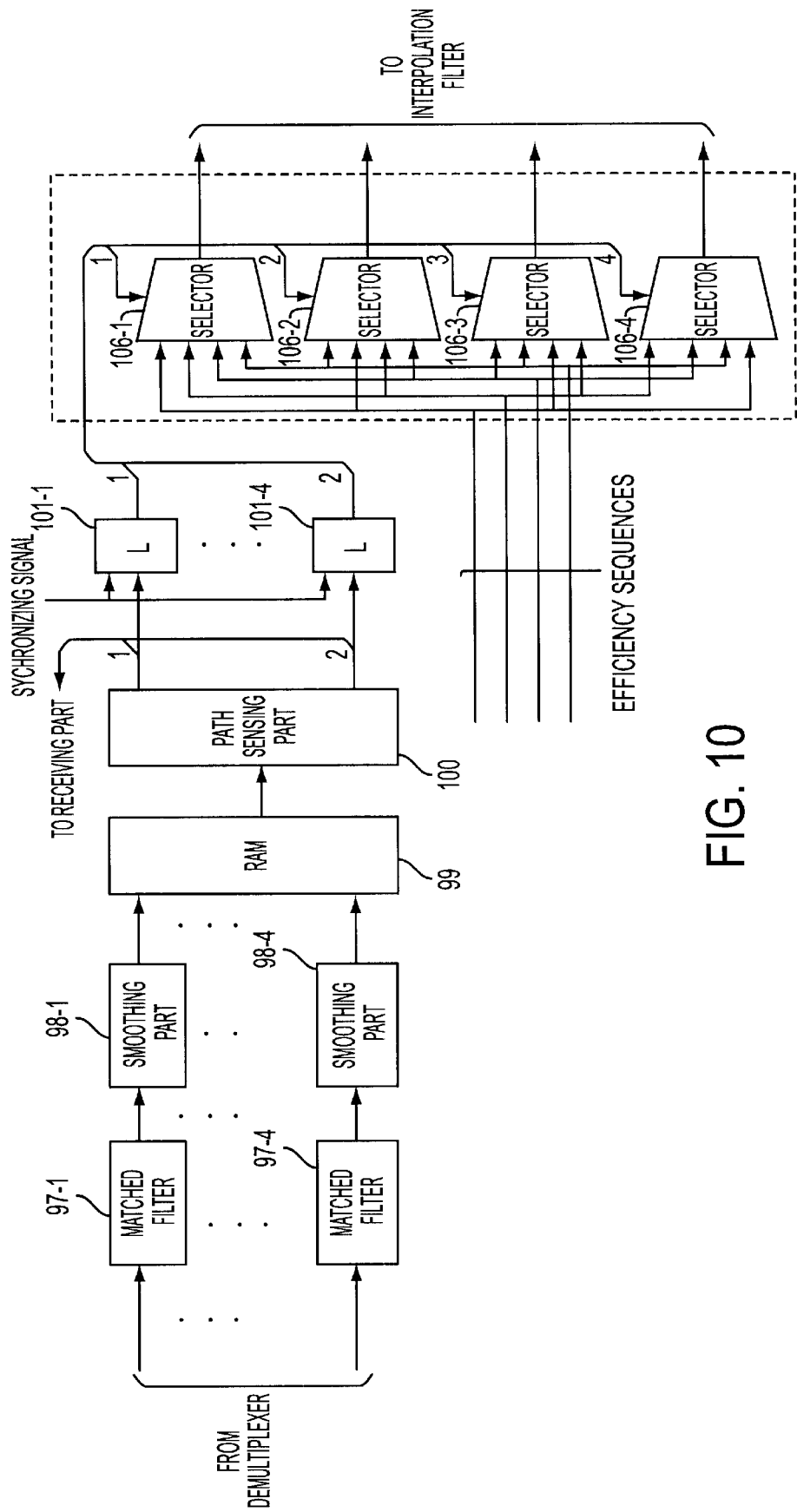
FIG. 10 is a block diagram showing another example of a configuration of the searcher.

While the ROMs 96-1 to 96-4 are respectively equipped in the interpolation filters 91-1 to 91-4 in the present embodiment, selectors 105-1 to 105-4 having input terminals to which the four coefficient sequences shown in FIG. 8(a) are supplied in different permutations and select inputs to which the outputs of the latch 101-1 to 101-4 are respectively connected may be equipped in stead of the mapping ROM 102 as shown in FIG. 10, for example, and the outputs of the selectors 105-1 to 105-4 may be directly connected to the multipliers 94-1 to 94-4 not through the ROMs 96-1 to 96-4.

Besides, the selectors 105-1 to 105-4 may be arranged in the interpolation filters 91-1 to 91-4 instead of the ROMs 96-1 to 96-4, or may be configured as a ring shift register in which the above-mentioned four coefficient sequences are loaded concurrently and circulated in synchronization with the synchronizing signal.

Figure 11:
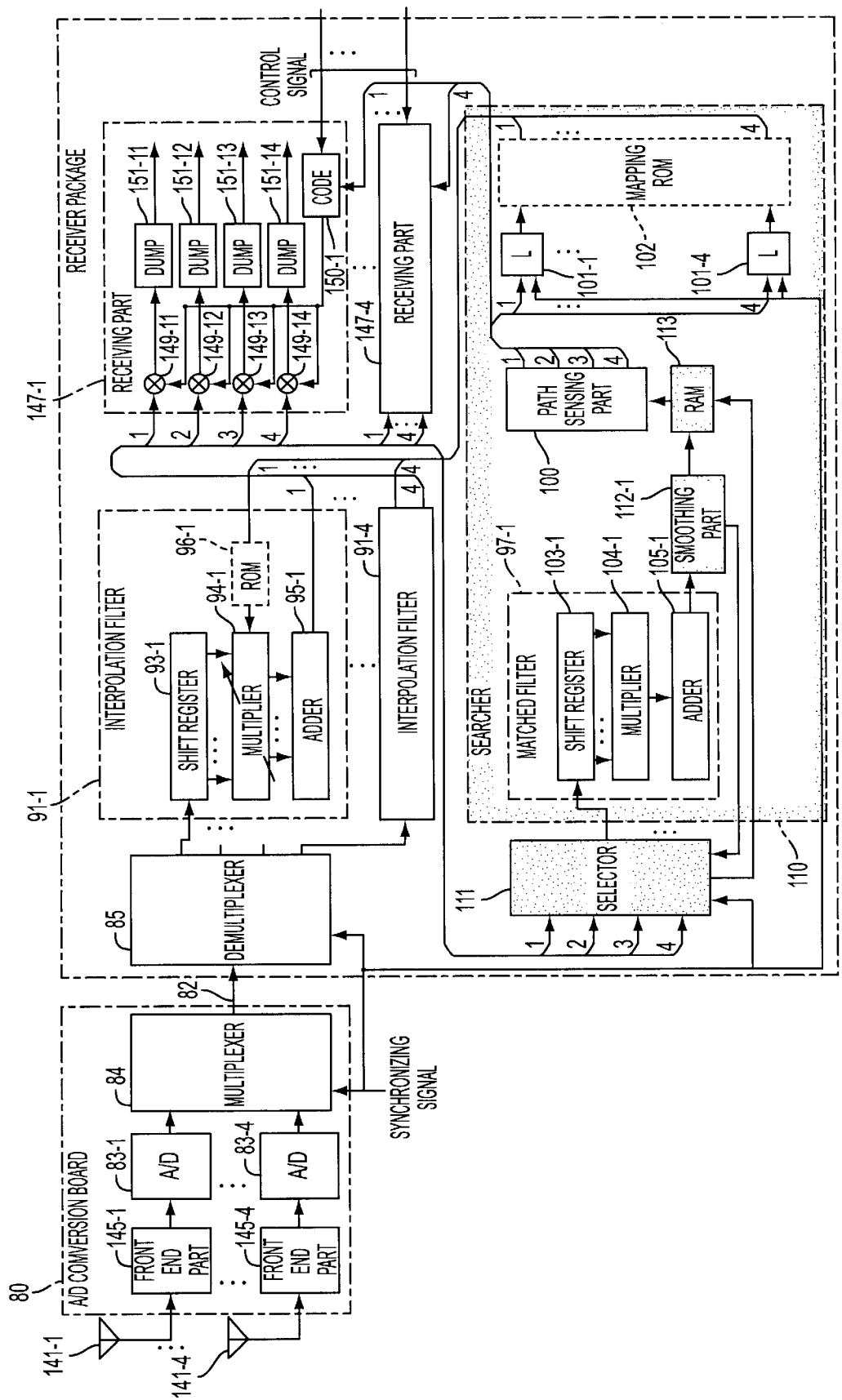
FIG. 11 is a block diagram showing an embodiment of the fifth radio receiver according to the present invention.

FIG. 11 is a block diagram showing an embodiment of the fifth radio receiver according to the present invention.

In the diagram, parts having the same functions and configuration as those shown in FIG. 7 are designated by like numerals, and the description thereof will be omitted here.

The configurational differences between the present embodiment and the embodiment shown in FIG. 7 are that:

a 10 searcher 110 is equipped in place of the searcher 92; and a selector 111 having a select input to which the synchronizing signal is supplied and four inputs respectively connected to the outputs of the interpolation filters 91-1 to 91-4 is equipped at the previous stage of the searcher 110.

The configurational differences between the searcher 110 and the searcher 92 are that: a smoothing part 112 is equipped in place of the smoothing part 98-1; a RAM 113 having a certain address input connected to the control output of the selector 111 is equipped in place of the RAM 99; the control output of the smoothing part 112 is connected to the control input of the selector 111; the matched filters 97-2 to 97-4 and the smoothing parts 98-2 to 98-4 are not equipped at the previous stage of the RAM 111; and the output of the selector 111 is directly connected to the input of the matched filter 97-1.

In connection to this, the correspondence between the present embodiment and the block diagram shown in FIG. 1 is the same as those in the embodiments shown in FIGS. 4 and 7, with exceptions in that: the selector 111, the matched filter 97-1, the smoothing part 112-1, and the RAM 113 correspond to the path monitoring means 31; and the path sensing part 100, the latches 101-1 to 101-4, and the mapping ROM 102 correspond to the phase discrimination means 32.

The operation of the present embodiment will be described in the following.

The selector 111 generates a select signal (which takes a value of one of "0" to "3" re-cyclically) synchronizing with the synchronizing signal by counting following the time point in which the after-mentioned control signal is supplied to the above-mentioned control input and the proximate time point in which the synchronizing signal is updated, and supplies the select signal to the RAM 113.

Besides, the selector 111 selects the discrete signal previously parallelized to the values of the above-mentioned select signal, from among the discrete signals outputted by the interpolation filters 91-1 to 91-4.

In the searcher 110, the matched filter 97-1 obtains the correlation between the discrete signal thus selected and the despreading signals in the same manner as in the aforementioned seventh radio receiver, and the smoothing part 112 obtains the power spectra given as the results of the correlation re-cyclically in the order of time series to obtain a delay profile.

Besides, the smoothing part 112 stores the delay profile into the storage area corresponding to the value of the select signal given by the selector 111 within the storage area of the RAM 113.

Moreover, in the cases where the power given in the order of time series in the form of the delay profile exceeds a prescribed threshold value or in the cases where power above the threshold value does not appear over a prescribed period, the smoothing part 112 supplies a certain control signal to the selector 111.

When supplied with the certain control signal, the selector 111 updates the value of the select signal by counting as described above, and supplies the select signal to the RAM 113.

In short, by the application of the searcher 110 in place of the searcher 92 and the addition of the selector 111, the interpolation filters 91-1 to 91-4 operate in the same way as in the embodiment shown in FIG. 7.

Therefore, according to the present embodiment, the hardware configuration is simplified inasmuch as the time required for obtaining the delay profile is acceptably short.

Figure 12:
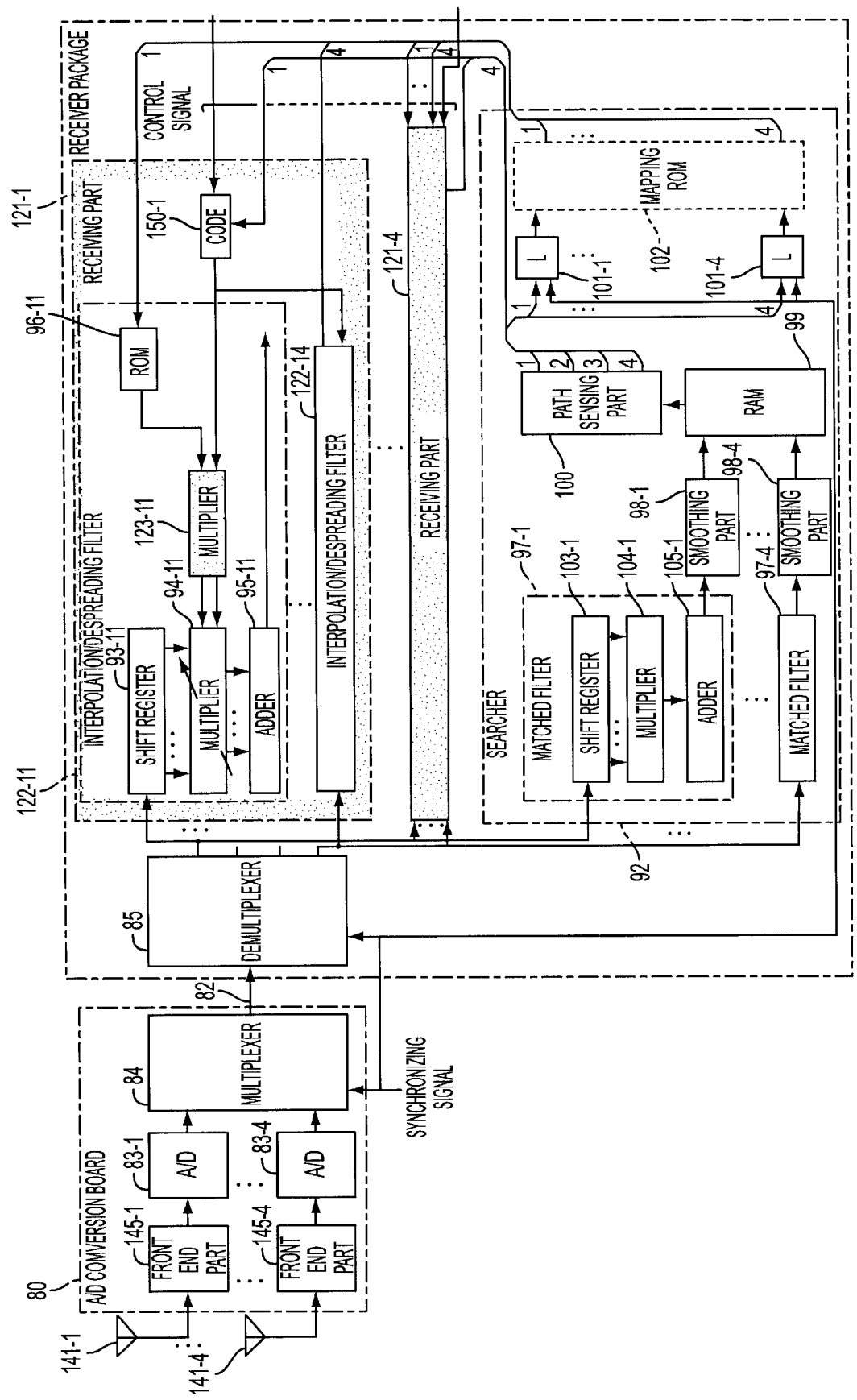
FIG. 12 is a block diagram showing an embodiment of the sixth and seventh radio receivers and the first despreader according to the present invention.

FIG. 12 is a block diagram showing an embodiment of the sixth and seventh radio receivers and the first despreader according to the present invention.

In the diagram, parts having the same functions and configuration as those shown in FIG. 7 are designated by like numerals, and the description thereof will be omitted here.

The configurational differences between the present embodiment and the embodiment shown in FIG. 7 are that the interpolation filter 91-1 to 91-4 are not equipped, and receiving parts 121-1 to 121-4 equipped in place of the receiving parts 147-1 to 147-4 are directly connected to the four outputs of the demultiplexer 85.

The receiving part 121-1 is composed of interpolation/despreading filters 122-11 to 122-14 individually direct-connected to the four outputs of the demultiplexer 85, and a despreading code generating part (CODE) 150-1 shared by the interpolation/despreading filters 122-11 to 122-14.

Among the interpolation/despreading filters 122-11 to 122-14, as shown in FIG. 12, the interpolation/despreading filter 122-11 is configureed by combining the interpolation filters 91-1 to 91-4 and the receiving part 147-1 shown in FIG. 7 in a way as described in the following (a) through (d).

For clear distinction from the components of the other interpolation/despreading filters 122-12 to 122-14, the components of the interpolation/despreading filter 122-11 are, in principle, designated by numerals in which the index numbers of the numerals for the components of the interpolation filters 91-1 to 91-4 shown in FIG. 7 and receiving part 147-1 shown in FIG. 14 are used as the second index numbers, and the first index numbers of "1", are added in the following.

(a) A multiplier 123-11 as a substitute for the multiplier 149-11 is arranged at the stage between the ROM 96-11 and the multiplier 94-11.

(b) The output of the despreading code generating part 150-1 is connected to the multiplier (multiplicand) input of the multiplier 123-11.

(c) The dump filter 151-1 is combined into a transversal filter composed of the shift register 93-11, the multiplier 94-11, and the adder 95-11.

(d) The multipliers 149-11 to 149-14 and the dump filters 151-11 to 151-14 are not equipped.

In connection to this, since the interpolation filters 122-12 to 122-14 are the same as the interpolation filter 122-11 in configuration, the corresponding components are designated by like numerals with the first index number of "2" to "4", respectively, and the descriptions and diagrams thereof will be omitted here in the following.

As for the correspondence between the present embodiment and the block diagram shown in FIG. 2, the receiving parts 121-4 to 121-4 correspond to the filtering means 61, and the searcher 92 corresponds to the control means 62.

The operation of the present embodiment will be described in the following.

In the ROMs 96-11 to 96-14 through 96-41 to 96-44, the coefficient sequences shown in FIG. 8($a$) are stored previously in the same manner as in the ROMs 96-1 to 96-4 equipped in the embodiment shown in FIG. 7

The despreading code generating parts 150-1 to 150-4 generate despreading codes synchronizing with the path detection signals outputted from the path sensing part 100 equipped in the searcher 92, in the same manner as in the embodiment shown in FIG. 7.

The ROMs 96-11 to 96-14 through 96-41 to 96-44 output the coefficient sequences corresponding to the distinction information supplied by the mapping ROM 102 equipped in the searcher 92, among the above-mentioned coefficient sequences. And the multipliers 123-11 to 123-14 through 123-41 to 123-44 multiply the respective coefficient sequences by the despreading codes respectively generated by the despreading code generating parts 150-1 to 150-4, and supply the products to the multipliers 94-11 to 94-14 through 94-41 to 94-44.

In other words, in the receiving parts 121-1 to 121-4, the transfer functions for the transversal filters, which are composed of the shift registers 93-11 to 93-14 through 93-41 to 93-44, the multipliers 94-11 to 94-14 through 94-41 to 94-44, and the adders 95-11 to 95-14 through 95-41 to 95-44, are fitly set in the form of the products of the coefficient sequences given by the ROMs 96-11 to 96-14 through 96-41 to 96-44 and the despreading codes given by the despreading code generating parts 150-1 to 150-4, respectively.

As described above, according to the present embodiment, both the interpolation processing and the despread processing are performed at the same time in different configurations from that of the embodiment shown in FIG. 7. Therefore, like the embodiment shown in FIG. 7, even in the cases where the number of the antennas designated by the numerals of "141" is large, the restriction on the mounting of the hardware is eased and the suppression of interference based on the sector zone configuration and the diversity receiving system becomes possible.

In connection to this, while the ROMS 96-11 to 96-14 through 96-41 to 96-44 are respectively equipped in the interpolation/despreading filters 122-11 to 122-14 through 122-41 to 122-44 in the present embodiment, the ROMs 96-11 to 96-14 through 96-41 to 96-44 may be equipped as ROMs shared by all or each of the receiving parts 121-1 to 121-4 in the cases where a means surely is equipped for holding the coefficients to be supplied to the multipliers 123-11 to 123-14 through 123-41 to 123-44.

Besides, while in the interpolation/despreading filters 122-11 to 122-14 through 122-41 to 122-44 are equipped with the shift registers 93-11 to 93-14 through 93-41 to 93-44 respectively in the present embodiment, the shift registers 93-11 to 93-14 through 93-41 to 93-44 may be equipped as shift registers shared by the receiving parts 121-1 to 121-4, respectively.

Figure 13:
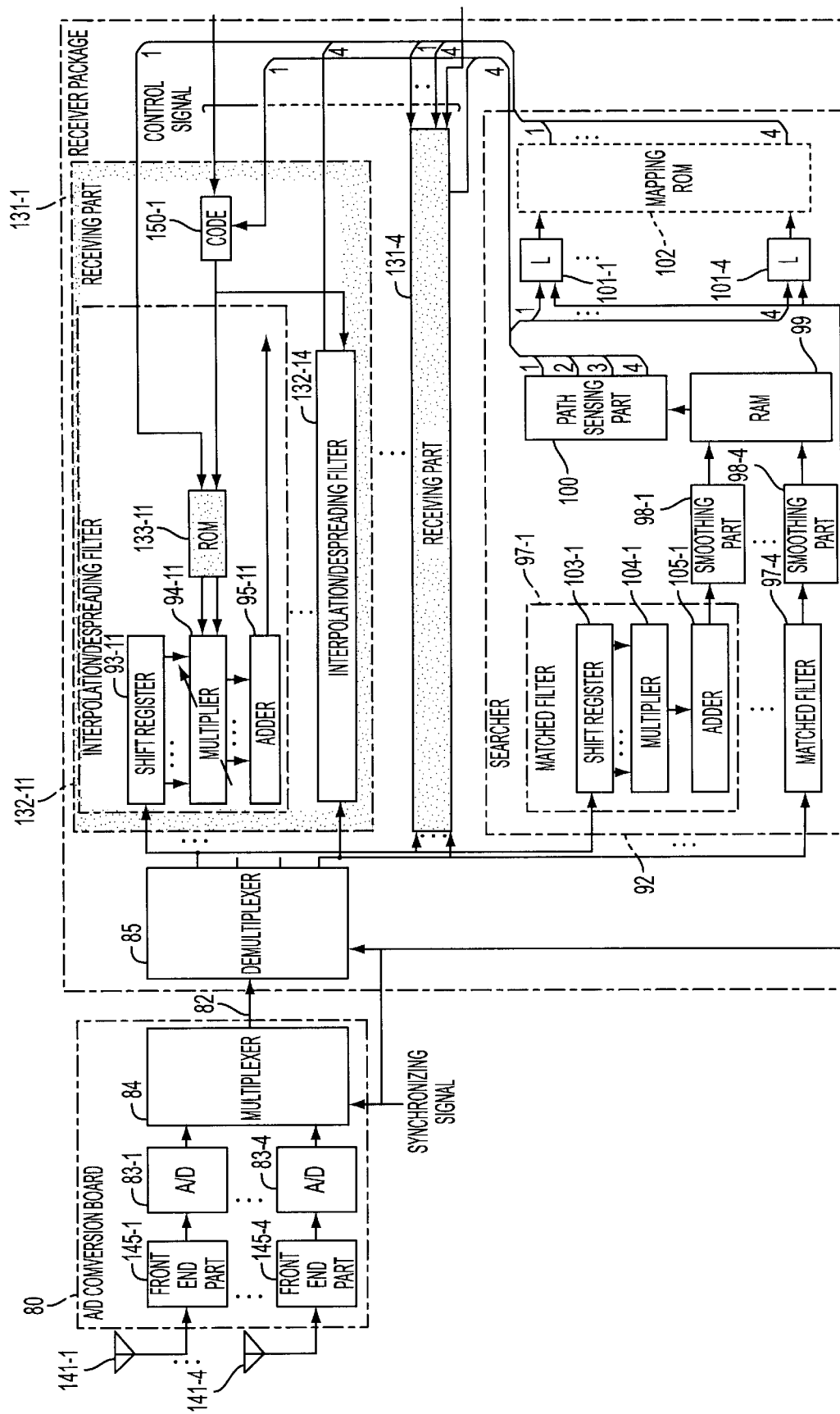
FIG. 13 is a block diagram showing an embodiment of the eighth and ninth radio receivers and the second despreader according to the present invention.

FIG. 13 is a block diagram showing an embodiment of the eighth and ninth radio receivers and the second despreader according to the present invention.

In the diagram, parts having the same functions and configurations as those shown in FIG. 12 are designated by like numerals, and the description thereof will be omitted here.

The configurational difference between the present embodiment and the embodiment shown in FIG. 12 is that the configuration of receiving parts 131-1 to 131-4 is equipped in place of the receiving parts 121-1 to 121-4.

The configurational difference between the receiving part 131-1 and the receiving part 121-1 is that interpolation/despreading filters 132-11 to 132-14 are equipped in place of the interpolation/despreading filters 122-11 to 122-14.

The configurational differences between the interpolation/despreading filter 132-11 and the interpolation/despreading filter 122-11 are that: a ROM 133-11 is equipped in place of the ROM 96-11, the multiplier 123-11 is not equipped; the outputs of the ROM 133-11 are directly connected to the multiplier 94-11; and the output of the despreading code generating part 150-1 is connected to a certain address input (here, assume one bit of MSB, for ease of description) of the ROM 133-11.

In connection to this, since the interpolation despreading filters 132-12 to 132-14 are the same as the interpolation despreading filter 132-11 in configuration, the corresponding components are hereinafter designated by like numerals with the first index numbers of "2" to "4", respectively, and the descriptions and diagrams thereof will be omitted here.

Besides, since the interpolation filters 132-2 to 132-4 are the same as the interpolation filter 132-1 in configuration, the corresponding components are hereinafter designated by like numerals with the first index numbers of "2" to "4", respectively, and the descriptions and diagrams thereof will be omitted here.

As for the correspondence between the present embodiment and the block diagram shown in FIG. 3: the shift registers 93-11 to 93-14 through 93-41 to 93-44, the multipliers 94-11 to 94-14 through 94-41 to 94-44, and the adders 95-11 to 95-14 through 95-41 to 95-44 correspond to the filtering means 61; the ROMs 133-11 to 133-14 through 133-41 to 133-44 correspond to the storage means 71; and the searcher 92 and the despreading code generating parts 150-1 to 150-4 correspond to the control means 72.

The operation of the present embodiment will be described in the following.

The despreading code generating parts 150-1 to 150-4 respectively generate despreading codes synchronizing with the path detection signal outputted from the path sensing part 100.

The mapping ROM 102 outputs distinction information in the same manner as in the embodiment shown in FIG. 12.

Meanwhile, in accordance with the four coefficient sequences shown in FIG. 8(a) and the logical values of the above-mentioned despreading codes, the products of the binary (it is assumed here that it is "−1" and "1", for ease of description) respectively corresponding to the logical values and the coefficient sequences are stored in the ROMs 131-11 to 133-14 through 131-41 to 131-44 in advance.

In addition, the ROMS 131-11 to 131-14 through 131-41 to 131-44 supply the multipliers 94-11 to 94-14 through 94-41 to 94-44 with the products corresponding to the logical values of the despreading codes and the above-mentioned distinction information among the products stored respectively in advance.

In other words, transversal filters composed of the shift registers 93-11 to 93-14 through 93-41 to 93-44, the multipliers 94-11 to 94-14 through 94-41 to 94-44, and the adders 95-11 to 95-14 through 95-41 to 95-44 are supplied with the same coefficient sequences as the coefficient sequences supplied in the embodiment shown in FIG. 12, not via the multipliers 123-11 to 123-14 through 123-41 to 123-44, and perform despread processing along with the interpolation processing concurrently in accordance with the coefficient sequences.

As a result, according to the present embodiment, while the storage areas of the ROMs 133-11 to 133-14 through 133-41 to 133-44 are made double the size the of the storage areas of the ROMs 96-11 to 96-14 through 96-41 to 96-44 equipped in the embodiment shown in FIG. 12, no provision of the multipliers 123-11 to 123-14 through 123-41 to 123-44 is done, therfore a simplification of the hardware configuration is carried out.

Besides, in the present embodiment, multiplying in real time by the multipliers 123-11 to 123-14 through 123-41 to 123-44 are omitted, which allows despread processing in higher speeds compared to the embodiment shown in FIG. 12.

In connection to this, whilein the respective embodiments described above the present invention is applied to the receiving ends of radio transmission systems to which a CDMA system is applied, the present invention is not limited to such radio transmission systems of CDMA systems, and is applicable to radio transmission systems of FDMA systems and TDMA systems, regardless of the modulation systems applied along with these multiple access systems.

Besides, while in the respective embodiments described above the present invention is applied to the radio base stations of mobile communication systems in which radio zones thereof are formed as sector zones, the present invention is not limited to the mobile communication systems to which such zone configuration is applied, and is applicable to other radio transmission systems.

Moreover, in the respective embodiments described above, no description is given of the process of channel configuration and channel control applied in the mobile communication systems, but the present invention is applicable regardless of the process of channel configuration and channel control.

Furthermore, in the respective embodiments described above, no description is given of the method of the multiplexing processing by the multiplexer 84 or of the transmission format of the signals to be transmitted to the line 82, but as for the method of multiplexing processing and the transmission format, any known techniques may be applied.

Furthermore, in the respective embodiments described above, no description is given of the specific values of the over-sampling frequency and the decimation sampling frequency, but these frequencies may take any value inasmuch as the values are adaptive to the number of antennas and the occupied bandwidth of received signals (in cases where the CDMA systems are applied, the chip rates and the modulation processing in advance of the spread processing), and as the interpolation processing and the despread processing are surely performed in digital domain based on the sampling theorem.

Furthermore, in the respective embodiments described above, the A/D converters 83-1 to 83-4 A/D converts in different phases set at regular intervals on time axis, at the common decimation sampling frequency. However, these phases for A/D conversion may be set at any interval on the time axis inasmuch as the interpolation processing has desirable accuracy.

Furthermore, in the respective embodiments described above, the aforementioned transversal filter interpolation processes or filter processes consisting of the interpolation processing and the despread processing. Such a transversal filter may be composed of a multiplier and dump filter for multiplying the output of the demultiplexer 85 and the output of the multipliers 123-11.

Furthermore, in the respective embodiments described above, the transversal filters perform the interpolation processing or both the interpolation processing and the despread processing. However, in the cases where the transient responses according to the switching of the coefficients determining transfer functions are acceptably short, infinite impulse response (IIR) filters, for example, may be applied.

Furthermore, in the respective embodiments described above, the channels are individually allocated based on the process of channel control, and the plurality of receiving parts designated by the numerals of one of "147", "121", and "131" are equipped. However, the number of receiving parts may be, for example, "1", in the case where the call to have channels established via the radio transmission channels at a time is one in number.

Furthermore, in the respective embodiments described above, in order to allow the extraction of the components of the received signals having reached from a desired sector zone, the modulation signals to be synthetic processed are generated in the process of the despread processing.

However, the present invention is not limited to such synthetic processing. For example, in order to constitute a desired scanning antenna with the antennas 141-1 to 141-4, any synthetic processing for executing a part or all of phase scanning, frequency scanning, and feeding point scanning may be performed.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A radio receiver comprising:
   a plurality N of decimation means for sampling received signals having reached concurrently to a plurality N of antennas respectively in baseband domain thereof at a plurality N of different phases and at a frequency of twice or more than the occupied bandwidth thereof and generating a plurality N of discrete signals individually corresponding to the received signals;
   multiplexing means for multiplexing said plurality N of discrete signals are outputting a multiple-signal;
   demultiplexing means for demultiplexing said multiple-signal and restoring said plurality N of discrete signals; and
   a plurality N of prediction means for predicting instantaneous values thereof individually at a common time point given from the outside or set in advance and generating baseband signals respectively showing said received signals, concerning said plurality N of discrete signals restored by said demultiplexing means.

2. The radio receiver according to claim 1, wherein
   said received signals are generated based on a direct sequence in which a spreading code of fc in chip rate is applied; and
   said plurality N of decimation means samples said received signals respectively in synchronization with a sampling clock below (½fc) in period.

3. The radio receiver according to claim 2, wherein
   said plurality N of decimation means samples said received signals respectively at different phases set at regular intervals below (½ Nfc) on the time axis.

4. The radio receiver according to claim 2, wherein the said radio receiver further comprises:
   path monitoring means for applying despread processing concurrently to said plurality N of discrete signals restored by said demultiplexing means and obtaining a spectra of a power despreaded within transmission bands;
   phase discrimination means for obtaining a time point in which the power exceeds a prescribed threshold value under said spectra of the power and which corresponds to a path designated from the outside, supplying said plurality N of prediction means with said time point as a common time point, and discriminating said time point as a phase of said sampling clock; and
   despreading means for applying said despread processing based on a despreading code of the phase discriminated by said phase discrimination means to the N baseband signals generated by said plurality N of prediction means and obtaining demodulation signals individually corresponding to said received signals.

5. The radio receiver according to claim 3, wherein the said radio receiver further comprises:

path monitoring means for applying despread processing concurrently to said plurality N of discrete signals restored by said demultiplexing means and obtaining a spectra of a power despreaded within transmission bands;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as a phase of said sampling clock; and despreading means for applying said despread processing based on a despreading code of the phase discriminated by said phase discrimination means to the N baseband signals generated by said plurality N of prediction means and obtaining demodulation signals individually corresponding to said received signals.

6. The radio receiver according to claim 2, wherein the said radio receiver further comprises:

path monitoring means for despread processing and measuring a power despreaded within transmission bands resulting from said despread processing in series concerning said plurality N of discrete signals restored by said demultiplexing means, and obtaining a measured power spectra in the order of the time-series;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and despreading means for applying despread processing based on the despreading code of the phase discriminated by said phase discrimination means to N baseband signals generated by said plurality N of prediction means and obtaining demodulation signals individually corresponding to said received signals having reached to said plurality N of antennas.

7. The radio receiver according to claim 3, wherein the said radio receiver further comprises:

path monitoring means for despread processing and measuring a power despreaded within transmission bands resulting from said despread processing in series concerning said plurality N of discrete signals restored by said demultiplexing means, and obtaining a measured power spectra in the order of the time-series;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and despreading means for applying despread processing based on the despreading code of the phase discriminated by said phase discrimination means to N baseband signals generated by said plurality N of prediction means and obtaining demodulation signals individually corresponding to said received signals having reached to said plurality N of antennas.

8. The radio receiver according to claim 2, wherein the said radio receiver further comprises:

path monitoring means for applying despread processing concurrently to said plurality N of discrete signals restored by said demultiplexing means and obtaining a spectra of a power despreaded within transmission bands;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and multiplication means for obtaining a product of a transfer function determining filtering characteristics to be used in said prediction processing and a despreading code of the phase discriminated by said phase discrimination means;

wherein said plurality N of prediction means perform despread processing along with said prediction processing to said plurality N of discrete signals restored by said demultiplexing means by filter processing based on the filtering characteristics given in the form of a transfer function equal to said product obtained by said multiplication means, and obtain demodulation signals individually corresponding to said received signals.

9. The radio receiver according to claim 3, wherein the said radio receiver further comprises:

path monitoring means for applying despread processing concurrently to said plurality N of discrete signals restored by said demultiplexing means and obtaining a spectra of a power despreaded within transmission bands;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and multiplication means for obtaining a product of a transfer function determining filtering characteristics to be used in said prediction processing and a despreading code of the phase discriminated by said phase discrimination means;

wherein said plurality N of prediction means perform despread processing along with said prediction processing to said plurality N of discrete signals restored by said demultiplexing means by filter processing based on the filtering characteristics given in the form of a transfer function equal to said product obtained by said multiplication means, and obtain demodulation signals individually corresponding to said received signals.

10. The radio receiver according to claim 8, wherein the said radio receiver further comprises:

path monitoring means for performing despread processing and the measurement for a power despreaded within transmission bands resulting from said desptead processing in series concerning the said plurality N of discrete signals restored by said demultiplexing means, and obtaining a measured power spectra in the order of the time-series;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and multiplication means for obtaining a product of a transfer function determining filtering characteristics to be used in said prediction processing and a despreading code of the phase discriminated by said phase discrimination means;

wherein said plurality N of prediction means perform despread processing along with said prediction processing to said plurality N of discrete signals restored by said demultiplexing means by filter processing based on the filtering characteristics given in the form of a transfer function equal to said product obtained by said multiplication means, and obtain demodulation signals individually corresponding to said received signals.

11. The radio receiver according to claim 9, wherein the said radio receiver further comprises:

path monitoring means for performing despread processing and the measurement for a power despreaded within transmission bands resulting from said despread processing in series concerning the said plurality N of discrete signals restored by said demultiplexing means, and obtaining a measured power spectra in the order of the time-series;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and multiplication means for obtaining a product of a transfer function determining filtering characteristics to be used in said prediction processing and a despreading code of the phase discriminated by said phase discrimination means;

wherein said plurality N of prediction means perform despread processing along with said prediction processing to said plurality N of discrete signals restored by said demultiplexing means by filter processing based on the filtering characteristics given in the form of a transfer function equal to said product obtained by said multiplication means, and obtain demodulation signals individually corresponding to said received signals.

12. The radio receiver according to claim 2, wherein the said radio receiver further comprises:

path monitoring means for applying despread processing concurrently to said plurality N of discrete signals restored by said demultiplexing means to obtain a spectra of a power despreaded within transmission bands;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and storage means which has products of all the combinations between opposite-signed constants individually corresponding to the binary and transfer functions showing filtering characteristics to be used in said prediction processing stored in advance, with respect to the binary said despreading code may take and the mode of the prediction processing said plurality N of prediction means may perform;

wherein said plurality N of prediction means perform despread processing along with the prediction processing to said plurality N of discrete signals restored by said demultiplexing means by filter processing based on the filtering characteristics given in the form of transfer functions equal to products corresponding to logical values of the despreading codes given in series and the mode of the prediction processing given from the outside among the products stored in said storage means, and generate modulation signals individually corresponding to said received signals.

13. The radio receiver according to claim 3, wherein the said radio receiver further comprises:

path monitoring means for applying despread processing concurrently to said plurality N of discrete signals restored by said demultiplexing means to obtain a spectra of a power despreaded within transmission bands;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and storage means which has products of all the combinations between opposite-signed constants individually corresponding to the binary and transfer functions showing filtering characteristics to be used in said prediction processing stored in advance, with respect to the binary said despreading code may take and the mode of the prediction processing said plurality N of prediction means may perform;

wherein said plurality N of prediction means perform despread processing along with the prediction processing to said plurality N of discrete signals restored by said demultiplexing means by filter processing based on the filtering characteristics given in the form of transfer functions equal to products corresponding to logical values of the despreading codes given in series and the mode of the prediction processing given from the outside among the products stored in said storage means, and generate modulation signals individually corresponding to said received signals.

14. The radio receiver according to claim 12, wherein the said radio receiver further comprises:

path monitoring means for performing despread processing and the measurement for a power despreaded within transmission bands resulting from said despread processing in series concerning said plurality N of discrete signals restored by said demultiplexing means, and obtaining a measured power spectra in the order of the time-series;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and storage means which has products of all the combinations between opposite-signed constants individually corresponding to the binary and transfer functions showing filtering characteristics to be used in said prediction processing stored in advance, with respect to the binary said despreading code may take and the mode of the prediction processing said plurality N of prediction means may perform;

wherein said plurality N of prediction means perform despread processing along with the prediction processing to said plurality N of discrete signals restored by said demultiplexing means by filter processing based on the filtering characteristics given in the form of transfer functions equal to products corresponding to logical values of the despreading codes given in series and the mode of the prediction processing given from the outside among the products stored in said storage means, and generates modulation signals individually corresponding to the received signals having reached to said plurality N of antennas.

15. The radio receiver according to claim 13, wherein the said radio receiver further comprises:

path monitoring means for performing despread processing and the measurement for a power despreaded within transmission bands resulting from said despread processing in series concerning said plurality N of discrete signals restored by said demultiplexing means, and obtaining a measured power spectra in the order of the time-series;

phase discrimination means for obtaining a time point in which the power exceeds a prescribed threshold value under said spectra of the power and which corresponds to a path designated from the outside, supplying said plurality N of prediction means with said time point as a common time point, and discriminating said time point as the phase of said sampling clock; and storage means which has products of all the combinations between opposite-signed constants individually corresponding to the binary and transfer functions showing filtering characteristics to be used in said prediction processing stored in advance, with respect to the binary said despreading code may take and the mode of the prediction processing said plurality N of prediction means may perform;

wherein said plurality N of prediction means perform despread processing along with the prediction processing to said plurality N of discrete signals restored by said demultiplexing means by filter processing based on the filtering characteristics given in the form of transfer functions equal to products corresponding to logical values of the despreading codes given in series and the mode of the prediction processing given from the outside among the products stored in said storage means, and generates modulation signals individually corresponding to the received signals having reached to said plurality N of antennas.

\* \* \* \* \*